US009632718B2

(12) United States Patent
Aikoh et al.

(10) Patent No.: US 9,632,718 B2
(45) Date of Patent: Apr. 25, 2017

(54) CONVERGED SYSTEM AND STORAGE SYSTEM MIGRATION METHOD

(71) Applicant: Hitachi, Ltd., Tokyo (JP)

(72) Inventors: Kazuhide Aikoh, Tokyo (JP); Keisuke Hatasaki, Tokyo (JP); Akihisa Nagami, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 14/766,218

(22) PCT Filed: Mar. 15, 2013

(86) PCT No.: PCT/JP2013/057547
§ 371 (c)(1),
(2) Date: Aug. 6, 2015

(87) PCT Pub. No.: WO2014/141482
PCT Pub. Date: Sep. 18, 2014

(65) Prior Publication Data
US 2015/0370501 A1    Dec. 24, 2015

(51) Int. Cl.
*G06F 3/06* (2006.01)

(52) U.S. Cl.
CPC ............ *G06F 3/0625* (2013.01); *G06F 3/061* (2013.01); *G06F 3/067* (2013.01); *G06F 3/0619* (2013.01); *G06F 3/0647* (2013.01); *G06F 3/0665* (2013.01)

(58) Field of Classification Search
CPC ...... G06F 3/0625; G06F 3/061; G06F 3/0619; G06F 3/0647; G06F 3/0665; G06F 3/067
See application file for complete search history.

(56) References Cited

U.S. PATENT DOCUMENTS

| | | | |
|---|---|---|---|
| 2,108,748 A * | 2/1938 | Harner | H01M 4/20 429/217 |
| 6,098,129 A | 8/2000 | Fukuzawa et al. | |
| 2004/0103254 A1 | 5/2004 | Satoyama et al. | |
| 2005/0240740 A1 | 10/2005 | Takeda et al. | |
| 2009/0037680 A1 | 2/2009 | Colbert et al. | |

(Continued)

FOREIGN PATENT DOCUMENTS

| | | |
|---|---|---|
| EP | 1486862 A2 | 12/2004 |
| JP | 10-283272 A | 10/1998 |

(Continued)

OTHER PUBLICATIONS

International Search Report of PCT/JP2013/057547.

*Primary Examiner* — Ryan Bertram
(74) *Attorney, Agent, or Firm* — Mattingly & Malur, PC

(57) ABSTRACT

A converged system and migration method capable of preventing system performance degradation with respect to data transfer is proposed. A first calculation node continues executing I/O processing in response to an I/O request from an application; and, upon execution of the I/O processing, the first calculation node issues an I/O processing event notice indicating a transfer status of data on which the I/O processing has been executed. When receiving a migration command from a migration management unit, a second calculation node judges whether or not data stored in a first I/O node is data which should be transferred, based on the I/O processing event notice; and then transfers the data, which should be transferred, to a third calculation node.

12 Claims, 28 Drawing Sheets

(56) References Cited

U.S. PATENT DOCUMENTS

| | | | |
|---|---|---|---|
| 2009/0204775 A1 | 8/2009 | Satou et al. | |
| 2012/0265956 A1* | 10/2012 | Nakamichi | G06F 3/0605 |
| | | | 711/162 |
| 2013/0254368 A1* | 9/2013 | Guay | G06F 9/45533 |
| | | | 709/223 |

FOREIGN PATENT DOCUMENTS

| | | |
|---|---|---|
| JP | 2004-145855 A | 5/2004 |
| JP | 2005-309793 A | 11/2005 |
| JP | 2009-217818 A | 9/2009 |

\* cited by examiner

FIG.3

Configuration Management Table3211

| Calculation Node ID | Processor Performance | Memory Capacity | Network I/F | Address | Bandwidth |
|---|---|---|---|---|---|
| Calculation Node 5A | 4GHz×1 | 2GB | eth0 | 192.168.0.1 | 10Gbps |
| Calculation Node 5B | 4GHz×4 | 4GB | eth0 | 192.168.0.2 | 1Gbps |
| | | | eth1 | 192.168.0.3 | 1Gbps |
| Calculation Node 5C | 4GHz×4 | 3GB | eth0 | 192.168.0.4 | 1Gbps |
| | | | eth1 | 192.168.0.5 | 1Gbps |
| 32111 | 32112 | 32113 | 32114 | 32115 | 32116 |

FIG.4

Resource Allocation Management Table 3212

| Calculation Node ID | Applicaton ID | Processor Allocated Amount | Memory Allocated Amount |
|---|---|---|---|
| Calculation Node 5A | — | — | — |
| Calculation Node 5B | Application 53A | 4GHz×2 | 2GB |
| | Application 53B | 4GHz×2 | 2GB |
| Calculation Node 5C | Application 53C | 4GHz×1 | 2GB |
| | Application 53D | 4GHz×2 | 1GB |
| 32121 | 32122 | 32123 | 32124 |

FIG.5

Disk Management Table 3213

| I/O Node ID | Volume ID | Sector Number |
|---|---|---|
| I/O Node 1A | 10 | 0~1500 |
|  | 20 | 0~2000 |
| I/O Node 1B | 10 | 0~3000 |
|  | 20 | 0~1000 |

Pair Management Table 3214

| Pair Group | Migration Source | | Migration Destination | |
|---|---|---|---|---|
|  | I/O Node ID | Storage Device ID | I/O Node ID | Storage Device ID |
| Pair1 | I/O Node 1A | LU10 | I/O Node 2A | LU10 |
| Pair2 |  | LU20 |  | LU20 |

Event Table 1124

| Event ID | Migration Source Storage Device ID | Target Data Sector Number | Transfer Flag | Event Type |
|---|---|---|---|---|
| 001 | LU10 | 1000~1100 | Not Transferred | Table Update |
| 11241 | 11242 | 11243 | 11244 | 11245 |

FIG.8

Event Response Table 1224

| Event ID | Result | Transfer Status | Device ID | Sector Number | Data |
|---|---|---|---|---|---|
| 001 | Success | Not Transferred | LU10 | 1150 | 0100101010 |
| 12241 | 12242 | 12243 | 12244 | 12245 | 12246 |

FIG.9

Progress Management Table 1225

| Migration Source Storage Device ID | Target Data Sector Number | Transfer Flag |
|---|---|---|
| LU10 | 1000 | Transferred |
| | …… | …… |
| | 1010 | Transferred |
| | …… | …… |
| | 1500 | Not Transferred |

12251     12252     12253

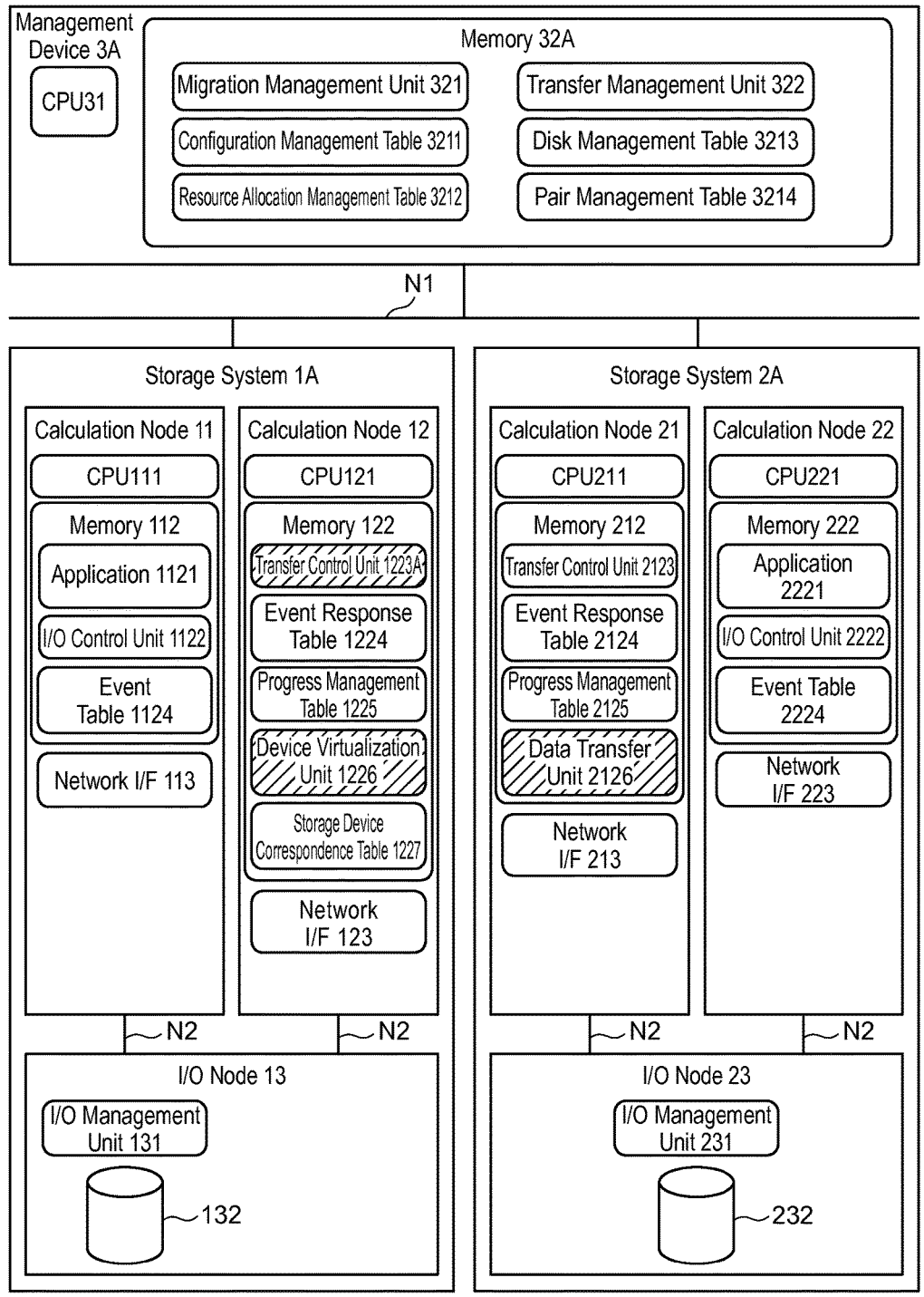

FIG.20

Storage Device Correspondence Table 1227

| Virtual Storage Device | | Physical Storage Device | | |
|---|---|---|---|---|
| I/O Node ID | Storage Device ID | Migration Destination Data Transfer Address | I/O Node ID | Storage Device ID |
| Calculation Node 2A | LU20 | 192.168.1.2 | I/O Node 1B | LU20 |
| | LU10 | | | LU10 |
| 12271 | 12272 | 12273 | 12274 | 12275 |

FIG.21

Mount Request R4

| Migration Source | | Migration Destination | |
|---|---|---|---|
| I/O Node ID | Storage Device ID | I/O Node ID | Storage Device ID |
| I/O Node 1A | LU10 | Calculation Node 1A | LU20 |

Read Request R5

| Device ID | | Sector Number |
|---|---|---|
| I/O Node ID | Storage Device ID | |
| I/O Node 1A | LU10 | 1000~1100 |

R51 (spans Device ID), R52 (Sector Number)

FIG.23

Write Request R6

| Device ID | | Sector Number | Data |
|---|---|---|---|
| I/O Node ID | Storage Device ID | | |
| I/O Node 1B | LU20 | 1000~1100 | 010001 |

R61 (spans Device ID), R62 (Sector Number), R63 (Data)

Write Request R7

| Transfer Destination Address | Device ID | | Sector Number | Data |
|---|---|---|---|---|
| | I/O Node ID | Storage Device ID | | |
| 192.168.1.2 | I/O Node 1B | LU20 | 1000~1100 | 010001 |

R71 — R72 — R73 — R74

Configuration Management Table 3211B

| Node ID | Processor Performance | Memory Capacity | Network I/F | Address | Bandwidth | Layout |
|---|---|---|---|---|---|---|
| Node 5A | 4GHz×1 | 2GB | eth0 | 192.168.0.1 | 10Gbps | 1-1 |
| Node 5B | 4GHz×4 | 4GB | eth0 | 192.168.0.2 | 1Gbps | 1-2 |
|  |  |  | eth1 | 192.168.0.3 | 1Gbps |  |
| Node 5C | 4GHz×4 | 3GB | eth0 | 192.168.0.4 | 1Gbps | 2-1 |
|  |  |  | eth1 | 192.168.0.5 | 1Gbps |  |
| Node 5D | 4GHz×1 | 2GB | eth0 | 192.168.0.6 | 10Gbps | 2-2 |
| 32111 | 32112 | 32113 | 32114 | 32115 | 32116 | 32117 |

< Layout Information >

Resource Allocation Management Table 3212B

| Resource ID | Role | Application ID | Processor Allocated Amount | Memory Allocated Amount |
|---|---|---|---|---|
| Node 5A | — | — | — | — |
| Node 5B | I/O Node | — | 4GHz×4 | 4GB |
| Node 5C | Calculation Node | Application 53C | 4GHz×1 | 2GB |
| | | Application 53D | 4GHz×2 | 1GB |

3212B1　3212B2　3212B3　3212B4　3212B5

CONVERGED SYSTEM AND STORAGE SYSTEM MIGRATION METHOD

TECHNICAL FIELD

The present invention relates to a converged system and a storage system migration method. Particularly, the invention is suited for use in a converged system and storage system migration method for executing migration processing by transferring data to outside a chassis.

BACKGROUND ART

Recently, the development of a storage system that integrates and packages hardware such as calculation nodes (server systems), I/O nodes (storage apparatuses), and network devices has been being promoted. This storage system is also called a converged storage system and is configured in such a manner that the calculation nodes, the I/O nodes, and the network devices are connected respectively in one chassis in advance. Various verifications and settings of the converged storage system are performed in advance in order to optimize the performance of the storage system in the chassis and then the converged storage system is supplied to a user company.

So, the user company to which the converged storage system is supplied can avoid the trouble of having to perform the various verifications and settings by themselves by not ordering the delivery of the calculation nodes, the I/O nodes, and the network devices individually and can start operating the delivered storage system in a short period of time. Moreover, an administrator of this converged storage system can centrally manage each of the calculation nodes, the I/O nodes, and the network devices included in the storage system by using one management device. Accordingly, it is unnecessary to provide a server administrator, a storage administrator, and a network administrator individually and it is possible to significantly reduce operational costs.

In this way, the converged storage system can realize enhancement of the system performance, enhancement of operability, and cost reduction. On the other hand, since it is a system which is packaged in advance, there is a problem of poor flexibility in its hardware configuration.

For example, if an attempt is made to migrate one storage system to another storage system, data in a chassis will have to be transferred to outside the chassis. Under this circumstance, the hardware configuration cannot be changed flexibly, for example, to transfer the data at high speeds by providing a dedicated connecting path between a migration source I/O node and a migration destination I/O node. Therefore, in this case, it is necessary to transfer the data via a general connecting path with a small bandwidth which is unfit for transfer of large amounts of data.

When the large amounts of data are to be transferred via the general connecting path with a small bandwidth, it requires a long time to complete the transfer processing. If the transfer processing is executed continuously for a long period of time, loads are focused on the I/O nodes in the migration source storage system during that time and I/O processing and communication processing are delayed. As a result, this causes a problem of performance degradation of the entire storage system for a long time.

Incidentally, examples of cases where it is required to transfer data in a chassis to outside the chassis include: a case where a storage system currently in use is about to reach the end of its life due to aged deterioration; a case where load leveling processing is executed between the chassis; or a case where power saving processing is executed to power off a chassis which has become surplus as a result of using only one of the chassis for a virtual server.

Accordingly, when data in the chassis of this converged storage system is to be transferred to outside the chassis, it is required to complete the transfer processing in a short period of time. A technique to transfer the data in the chassis to outside the chassis, that is, a technique to transfer the data between I/O nodes is disclosed in, for example, Patent Literature 1 and 2 mentioned below.

Patent Literature 1 discloses a technique to offload the processing for transferring data between I/O nodes to a calculation node. A calculation node in which applications operate is decided as an offload location for the transfer processing. The reason is to ensure consistency between data of a migration source I/O node and data of a migration destination I/O node.

Furthermore, Patent Literature 2 discloses a technique to back up data of a host computer between the host computer and an I/O subsystem, which cannot be connected directly because of the difference in their access interfaces, by transferring the data of the host computer to the I/O subsystem. Like Patent Literature 1, the I/O subsystem which intermediates I/O processing is decided as an offload location for the transfer processing.

CITATION LIST

Patent Literature

[Patent Literature 1] U.S. Patent No. 2009/0037680
[Patent Literature 2] Japanese Patent Application Laid-Open (Kokai) Publication No. 10-283272

SUMMARY OF INVENTION

Problems to be Solved by the Invention

However, regarding the technique of Patent Literature 1, the offload location for the transfer processing is the calculation node in which the applications operate. So, there is a problem of resource competition arising between the applications.

Furthermore, regarding the technique described in Patent Literature 2, the transfer processing can be offloaded to another device which is not the calculation node with the applications operating therein; however, the I/O processing also needs to be executed via the device which is the offload location, so that there is a problem of surplus communication overhead occurring because the I/O processing cannot be executed along the shortest path. As a result, this causes a problem of performance degradation of the entire storage system.

The present invention was devised in consideration of the above-described circumstances and proposes a converged system and migration method capable of preventing performance degradation of the entire system with respect to transfer processing.

Means for Solving the Problems

In order to solve the above-described problems, provided according to the present invention is a converged system including a migration source storage system, a migration destination storage system, and a management device for centrally managing the migration source storage system and the migration destination storage system, all of which are connected so that they can communicate with each other, wherein the migration source storage system is composed of a first calculation node, a second calculation node, and a first I/O node, an application which issues an I/O request operates in the first calculation node, and the first calculation node executes I/O processing in response to the I/O request from the application; wherein the migration source storage system is composed of a third calculation node and a second I/O node and data transferred to the third calculation node is transferred to and stored in the second I/O node; wherein the management device includes a migration management unit for issuing a migration command and the migration command includes a transfer command to transfer data stored in the first I/O node to the second I/O node; wherein the first calculation node continues executing I/O processing in response to the I/O request from the application, while issuing an I/O processing event notice indicating a transfer status of the data, on which it has executed the I/O processing, upon the execution of the I/O processing; and wherein when receiving the migration command from the migration management unit, the first calculation node or the second calculation node judges, based on the I/O processing event notice, whether or not the data stored in the first I/O node is data which should be transferred, and executes processing for transferring the data, which should be transferred, to the third calculation node.

Furthermore, in order to solve the above-described problems, a storage system migration method provided according to the present invention is a migration method for a converged system including a migration source storage system, a migration destination storage system, and a management device for centrally managing the migration source storage system and the migration destination storage system, all of which are connected so that they can communicate with each other, wherein the migration source storage system is composed of a first calculation node, a second calculation node, and a first I/O node, an application which issues an I/O request operates in the first calculation node, and the first calculation node executes I/O processing in response to the I/O request from the application; wherein the migration source storage system is composed of a third calculation node and a second I/O node and data transferred to the third calculation node is transferred to and stored in the second I/O node; wherein the management device includes a migration management unit for issuing a migration command and the migration command includes a transfer command to transfer data stored in the first I/O node to the second I/O node; wherein the storage system migration method includes: a first step executed by the first calculation node continuing executing I/O processing in response to the I/O request from the application, while issuing an I/O processing event notice indicating a transfer status of the data, on which it has executed the I/O processing, upon the execution of the I/O processing; and a second step executed when receiving the migration command from the migration management unit, by the first calculation node or the second calculation node judging, based on the I/O processing event notice, whether or not the data stored in the first I/O node is data which should be transferred, and executing processing for transferring the data, which should be transferred, to the third calculation node.

Advantageous Effects of Invention

According to the present invention, it is possible to prevent performance degradation of the entire converged system with respect to transfer processing in the converged system.

BRIEF DESCRIPTION OF DRAWINGS

FIG. 3 is a logical configuration diagram of a configuration management table.

FIG. 4 is a logical configuration diagram of a resource allocation management table.

FIG. 5 is a logical configuration diagram of a disk management table.

FIG. 6 is a logical configuration diagram of a pair management table.

FIG. 7 is a logical configuration diagram of an event table.

FIG. 8 is a logical configuration diagram of an event response table.

FIG. 9 is a logical configuration diagram of a progress management table.

FIG. 17 is an overall configuration diagram of a converged system according to the second embodiment.

FIG. 18 is a conceptual diagram of a mount request.

FIG. 19 is a conceptual diagram of a virtual storage device creation request.

FIG. 20 is a logical configuration diagram of a storage device correspondence table.

FIG. 21 is a conceptual diagram of a mount request.

FIG. 22 is a conceptual diagram of a read request.

FIG. 23 is a conceptual diagram of a write request.

DESCRIPTION OF EMBODIMENTS

An embodiment of the present invention will be explained below in detail with reference the relevant drawings.

(1) First Embodiment

(1-1) Outline of this Embodiment

Figure 1:
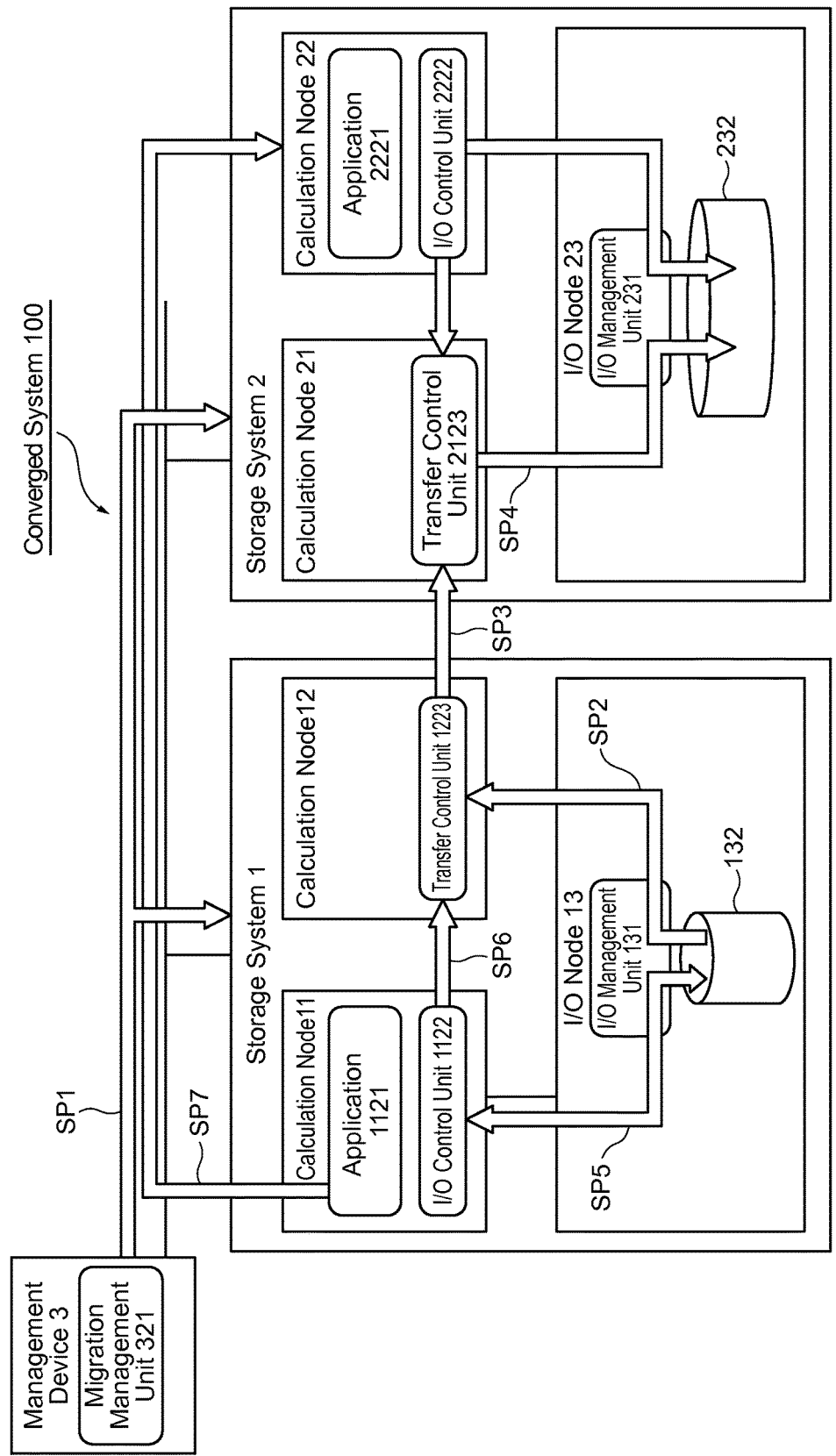
FIG. 1 is a schematic diagram for explaining the outline of this embodiment.

FIG. 1 illustrates a schematic diagram of this embodiment. This embodiment is configured so that when one storage system is to be migrated to another storage system in a converged system, I/O processing and transfer processing are separated from each other in the migration source storage system, the I/O processing is executed by a calculation node (server system) where an application operates and the transfer processing is offloaded to another calculation node and is executed by that other calculation node, thereby reducing loads on an I/O node (storage apparatus) and the calculation node, in which the application operates, and preventing delay of the transfer processing. Furthermore, this embodiment is intended to enhance the performance of the entire converged system.

Specifically speaking, storage systems 1, 2 and a management device 3 which constitute a converged system 100 execute the following processing. Firstly, when the management device 3 receives a storage system migration command from an administrator on the premise that the management device 3 periodically acquires and centrally manages configuration information from each of the storage systems 1 and 2, it issues a migration command to the migration source storage system 1 and the migration destination storage system 2 based on the received migration command and the centrally managed configuration information (SP1).

Incidentally, examples of a case where the management device 3 receives the storage system migration command, that is, a case where it is required to transfer data in a chassis to outside the chassis include: a case where a storage system currently in use is about to reach the end of its life due to aged deterioration; a case where load leveling processing is executed between the chassis; or a case where power saving processing is executed to power off a chassis which has become surplus as a result of using only one of the chassis for a virtual server.

After the migration source storage system 1 receives the migration command from the management device 3, a calculation node 12 which receives a transfer processing command in the migration command acquires necessary data, which should be transferred by a transfer control unit 1223, from a storage device 132 (SP2), and transfers the acquired transfer target data to the storage system 2 (SP3).

A calculation node 21 of the storage system 2 stores the data, which has been transferred by a transfer control unit 2123, in a storage device 232 (SP4).

On the other hand, a calculation node 11 where an application 1121 operates has an I/O control unit 1122 continue executing I/O processing associated with the operation of the application 1121 (SP5); and upon execution of the I/O processing, the calculation node 11 issues an I/O processing event notice to the calculation node 12 which executes the transfer processing (SP6).

The I/O processing event notice (FIG. 7) will be explained here briefly. It is issued when the I/O processing is executed and includes information for identifying data on which the I/O processing is executed (for example, an identifier and a sector number of the storage device 132), and information indicating a control request for that data.

The calculation node 12 which has received this I/O processing event notice can reliably transfer all pieces of data to the migration destination storage system 2 by retransferring data which was updated during the transfer. In other words, even if the transfer processing is offloaded to another calculation node 12 as a result of this I/O processing event notice, consistency between data of the migration source and data of the migration destination can be ensured.

Finally, the application 1121 which operates in the calculation node 11 is migrated to a calculation node 22 which is the migration destination (SP7), thereby completing the migration processing according to this embodiment.

In this way, this embodiment is designed to offload the transfer processing to another calculation node 12 different from the calculation node 11 in which the application 1121 operates, so that it is possible to reduce the loads on the I/O node 13 and the calculation node 11 and prevent the delay of the transfer processing.

Furthermore, since the calculation node 11 issues an I/O processing event notice to the calculation node 12 when executing the I/O processing, the data consistency between the migration source and the migration destination can be ensured. Therefore, it is possible to prevent performance degradation of the entire converged system 100 and execute the migration processing appropriately. The details of the converged system and the storage system migration method according to this embodiment will be explained below.

(1-2) Overall Configuration

Figure 2:
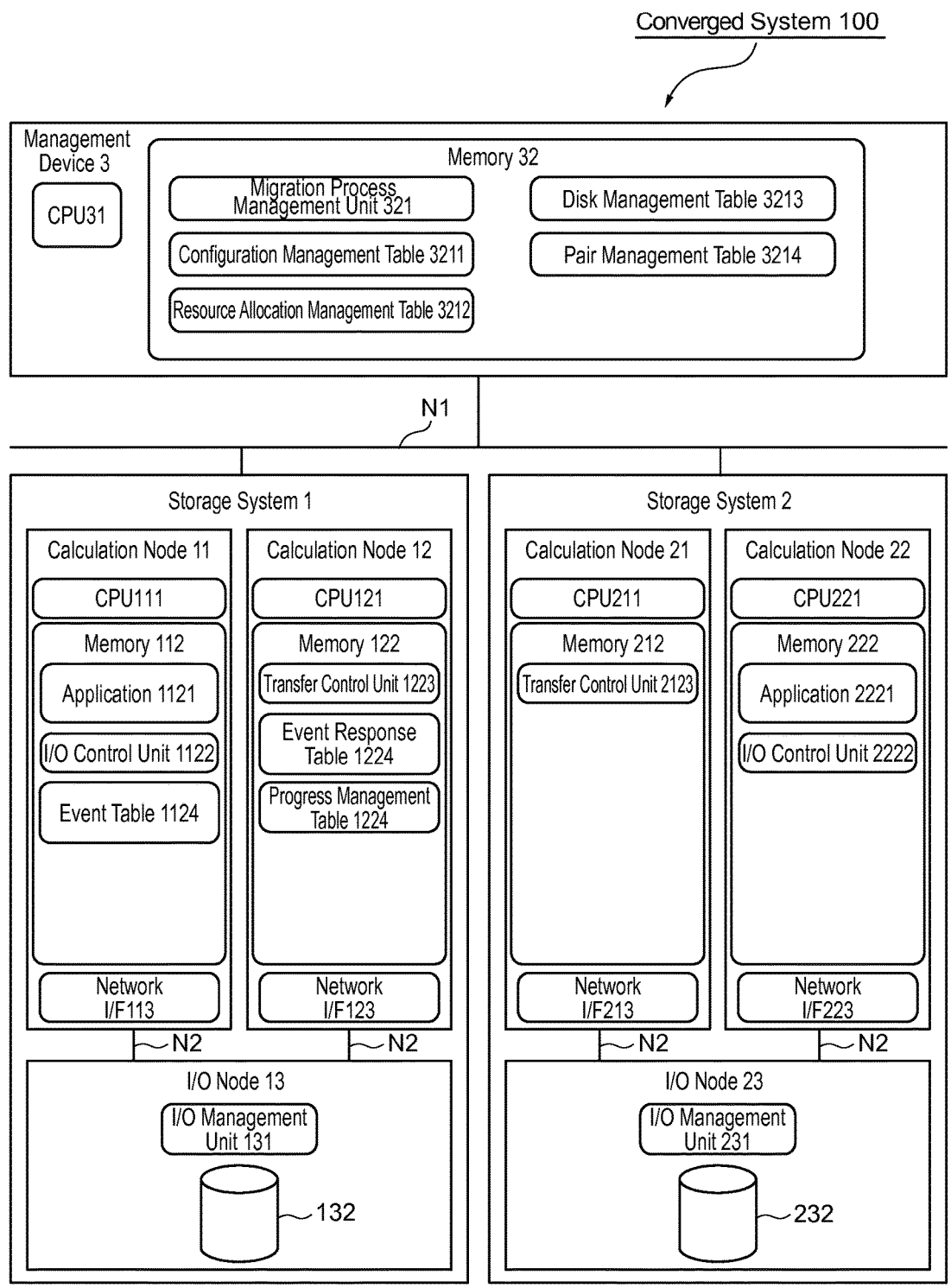
FIG. 2 is an overall configuration diagram of a converged system.

FIG. 2 illustrates an overall configuration of the converged system 100. With the converged system 100, the storage systems 1, 2 and the management device 3 are respectively connected via a communication path N1 so that they can communicate to each other. The communication path N1 is, for example, a LAN (Local Area Network) connected according to the Ethernet (registered trademark); and in this case, a communication protocol such as MPI (Message Passing Interface) or iSCSI (internet Small Computer System Interface) is used. Moreover, a communication path N2 which connects each calculation node in the storage system 1 and 2 with an I/O node is, for example, a SAN (Storage Area Network) connected according to Fibre Channel (FC) or PCI; and in this case, a communication protocol such as SCSI (Small Computer System Interface) is used.

Incidentally, only the communication paths N1 and N2 are illustrated in the drawing; however, a communication path for connecting each calculation node and all the I/O nodes respectively (for example, a communication path for connecting the calculation node 12 and the I/O node 23) may be provided and configured. Furthermore, a communication path for connecting the I/O nodes (for example, a communication path for connecting the I/O node 13 and the I/O node 23) may be provided and configured.

Next, the internal configuration of the storage system 1 will be explained. The storage system 1 is composed of the plurality of calculation nodes 11, 12 and the I/O node 13.

The calculation node 11 is composed of a CPU 111 for controlling the operation of the calculation node 11 in an integrated manner, a memory 112, and a network I/F113. The memory 112 stores various programs, such as the application 1121 and the I/O control unit 1122, and an event table 1124. The network I/F113 is an interface for connecting to the communication paths N1 and N2.

The calculation node 12 is different from the calculation node 11 because a memory 122 stores a transfer control unit 1223, an event response table 1224, and a progress management table 1225. Incidentally, this embodiment will be described by specifying that the I/O processing is executed by the calculation node 11, in which the application 1121 operates, and the transfer processing is executed by the calculation node 12.

The I/O node 13 is composed of an I/O management unit 131 and a storage device 132. The I/O management unit 131 is a program executed by a controller composed of a channel adapter, a cache memory, a microprocessor, and a disk adapter which are not illustrated in the drawing; and the I/O management unit 13 controls I/O processing for inputting data to, and outputting data from, the calculation node 11 and controls transfer processing for transferring data to/from the calculation node 12. The storage device 132 is, for example, an FC disk, SCSI disk, SATA disk, ATA (AT Attachment) disk or SAS (Serial Attached SCSI) disk and is a storage medium capable of storing large-capacity data.

Incidentally, one storage device 132 is illustrated in this example; however, the storage system may be configured so that a plurality of storage devices 132 are placed, and physical storage areas provided by the plurality of storage devices 132 are set as one RAID (Redundant Array Independent Disks) group, and logical storage areas provided by this one RAID group is set as one logical volume. Moreover, the number of RAID groups or logical volumes is not limited to one and a plurality of RAID groups or logical volumes may be set.

The storage system 2 is configured in the same manner as the storage system 1, so that an explanation about it is omitted here. Incidentally, the following explanation will be given by specifying that the migration processing according to this embodiment is executed to migrate data from the storage system 1 to the storage system 2. Accordingly, the storage system 1 and its constituent elements may be sometimes referred to as the migration source or the migration source storage system 1 and the storage system 2 and its constituent elements may be sometimes referred to as the migration destination or the migration destination storage system 2. Since the storage system 2 simply stores the transferred data in the storage device 232, the elements other than the transfer control unit 2123 in the configuration of the calculation node 21 are not necessarily required. The same applies to the calculation node 22.

The management device 3 is composed of a CPU 31 for controlling the operation of the management device 3 in an integrated manner and a memory 32. The memory 32 stores programs and various tables such as a migration management unit 321, a configuration management table 3211, a resource allocation management table 3212, a disk management table 3213, and a pair management table 3214. Upon receipt of a migration command from the administrator, the management device 3 executes arrangement selection processing with reference to these various tables and based on the programs by selecting the calculation node 12 as an offload location for the transfer processing or selecting the calculation node 21 of the storage system 2 as a migration destination.

(1-3) Details of Various Table Structures

FIG. 3 illustrates a conceptual diagram of the configuration management table 3211. The configuration management table 3211 stores information about hardware specifications of calculation nodes. The configuration management table 3211 is a table created by the management device 3 by periodically collecting configuration information of the calculation nodes for each of the storage systems 1 and 2 and is used to decide a calculation node as an offload location when offloading the transfer processing.

Specifically speaking, the configuration management table 3211 is constituted from a calculation node ID column 32111, a processor performance column 32112, a memory capacity column 32113, a network I/F column 32114, an address column 32115, and a bandwidth column 32116.

The calculation node ID column 32111 stores an identifier of a calculation node centrally managed by the management device 3. The processor performance column 32112 stores a clock frequency of a processor (CPU), which the relevant calculation node has, and the number of processors having that clock frequency as processor performance. The memory capacity column 32113 stores the maximum capacity of the memory which the calculation node has. The network I/F column 32114 stores an identifier of a network I/F which the calculation node has. The address column 32115 stores an address of the corresponding network I/F. The bandwidth column 32116 stores a bandwidth when the corresponding network I/F is used.

Accordingly, in a case of FIG. 3, for example, regarding a calculation node whose identifier is "Server 5A," the processor performance is "4 GHz"×1 unit and the maximum capacity of the memory is "2 GB." Moreover, it is shown that this calculation node has a network I/F whose identifier is "eth0" and the address of this network I/F is "192.168.0.1," and the bandwidth of a network when this network I/F is used is "10 Gbps."

Incidentally, it is shown in this example that the identifier like "eth0" is stored as the identifier of the network I/F for connection to a LAN; however, an identifier like "FC0" may be stored as the identifier of the network I/F for connection to a SAN. Furthermore, in this case, a WWN (World Wide Name) may be stored as the address.

FIG. 4 illustrates a conceptual diagram of the resource allocation management table 3212. The resource allocation management table 3212 stores information about a resource amount allocated to the relevant calculation node. The resource allocation management table 3212 is a table created by the management device 3 by periodically collecting configuration information of calculation nodes of each of the storage system 1 and 2 and is used to decide a calculation node as an offload location when offloading the transfer processing.

Specifically speaking, the resource allocation management table 3212 is constituted form a calculation node ID column 32121, a service ID column 32122, a processor allocated amount column 32123, and a memory allocated amount column 32124.

The calculation node ID column 32121 stores an identifier of a calculation node centrally managed by the management device 3. The service ID column 32122 stores an identifier of a service (application). The processor allocated amount column 32123 stores processor performance allocated to the relevant service. The memory allocated amount column 32124 stores the memory capacity allocated to the relevant service.

Therefore, in a case of FIG. 4, for example, regarding a calculation node whose identifier is "Server 5A," no service is executed and the processor and the memory are not allocated. Such a calculation node corresponds to a calculation node which has just been newly introduced. On the other hand, regarding a calculation node whose identifier is "Server 5B," "Service 53A" and "Service 53B" are allocated; and the processor performance "4 GHz×2" and the memory capacity of "2 GB" are allocated to "Service 53A" of the above-listed services.

Incidentally, an unused resource amount of each calculation node can be calculated based on the difference between the physical specifications show in FIG. 3 and the resource allocated amount shown in FIG. 4. For example, the unused resource amount of the processor "Server 5B" can be calculated as follows. Referring to FIG. 3, the processor performance of "Server 5B" is "4 GHz×4." On the other hand, referring to FIG. 4, the processor allocated amount of "Server 5B" to "Service 53A" is "4 GHz×2" and the processor allocated amount of "Server 5B" to "Service 53B" is "4 GHz×2," so that the total processor allocated amount is "4 GHz×4." Therefore, the unused resource amount of this processor "Server 5B" can be calculated as "0" by subtracting the total allocated amount from the processor performance.

FIG. 5 illustrates a conceptual diagram of the disk management table 3213. The disk management table 3213 stores information for identifying volumes provided by I/O nodes. The disk management table 3213 is a table created by the management device 3 by periodically collecting configuration information about I/O nodes of each of the storage systems 1 and 2 and is used to decide a storage device (logical volume) on which the transfer processing is to be executed.

Specifically speaking, the disk management table 3213 is constituted from an I/O node ID column 32131, a volume ID column 32132, and a sector number column 32133.

The I/O node ID column 32131 stores an identifier of an I/O node centrally managed by the management device 3. The volume ID column 32132 stores an identifier of a logical volume provided by the storage device. The sector number column 32133 stores sector numbers which are units for a plurality of storage areas constituting the logical volume.

Therefore, FIG. 5 shows that, for example, an I/O node whose identifier is "Storage 1A" provides logical volumes whose identifiers are "10" and "20"; the logical volume whose identifier is "10" is composed of sectors with sector numbers "0" to "1500," and the logical volume whose identifier is "20" is composed of sectors with sector numbers "0" to "2000."

FIG. 6 illustrates a conceptual diagram of the pair management table 3214. The pair management table 3214 stores information indicating a correspondence relationship between migration sources, and migration destinations. The migration sources means I/O node and storage device which have source data, and migration destinations means I/O node and storage device which will be stored the data. The pair management table 3214 is a table created when the administrator executes a pair creation operation via a user interface of the management device 3; and the pair management table 3214 is used to decide a storage device on which the transfer processing is to be executed.

Specifically speaking, the pair management table 3214 is constituted from a pair group column 32141, a migration source column 32142, and a migration destination column 32143.

The pair group column 32141 stores an identifier of the relevant pair group. The migration source column 32142 stores an identifier of an I/O node and an identifier of a storage device at the migration source. The migration destination column 32143 stores an identifier of an I/O node and an identifier of a storage device at the migration destination.

Therefore, FIG. 6 shows that, for example, a pair group whose identifier is "Pair1" is a pair group to which "Storage 1A" is set as a migration source I/O node and "Storage 2A" is set as a migration destination I/O node; and storage devices (logical volumes) whose identifiers are "LU10" and "LU20" are set to the I/O node "Storage 1A" and the storage devices (logical volumes) whose identifiers are "LU10" and "LU20" are set to the I/O node "Storage 2A."

FIG. 7 illustrates a conceptual diagram of the event table 1124. The event table 1124 stores information for identifying the position of data updated by the I/O processing (write processing) and information indicating whether the updated data has been transferred from the migration source to the migration destination or not. The event table 1124 is a table created when an I/O control unit in one calculation node executes the I/O processing and is used to notify a transfer control unit in another calculation node of an I/O processing event.

Specifically speaking, the event table 1124 is constituted from an event ID column 11241, a migration source storage device ID column 11242, a target data sector number column 11243, a transfer flag column 11244, and an event type column 11245.

The event ID column 11241 stores an event ID. The migration source storage device ID column 11242 stores an identifier of the migration source storage device (logical volume) which stores data updated by the I/O processing. The target data sector number column 11243 stores the sector numbers of the relevant sectors storing the data updated by the I/O processing. The transfer flag column 11244 stores a transfer flag indicating whether the data updated by the I/O processing has been transferred or not. The event type column 11245 stores information about either a "table update" or an "I/O request".

Therefore, FIG. 7 shows that, for example, the I/O processing (write processing) has been executed on the data stored in the migration source storage device (the logical volume) whose identifier is "LU10," more specifically, on the data stored in the sectors with the sector numbers from "1000" to "1100" among a plurality of sectors constituting that logical volume. Then, since the processing for transferring the data to the migration destination is not executed immediately after the update, it is shown that the transfer flag is set as "Not Transferred." Incidentally, when this transfer flag indicates "Not Transferred," even if pre-update data has been transferred to the migration destination, the updated data will be transferred from the migration source to the migration destination.

FIG. 8 illustrates a conceptual diagram of the event response table 1224. The event response table 1224 stores information indicating the result of data transfer to the migration destination, information indicating the transfer status, and transferred data itself. The event response table 1224 is a table created when the transfer control unit which has received an I/O processing event notice executes processing corresponding to that I/O processing event notice and is used to notify the I/O control unit of an event response.

Specifically speaking, the event response table 1224 is constituted from an event ID column 12241, a result column 12242, a transfer status column 12243, a device ID column 12244, a sector number column 12245, and a data column 12246.

The event ID column 12241 stores an event ID. The result column 12242 stores information indicating whether the event has been successfully received or not. The transfer status column 12243 stores information indicating whether data has been transferred to the migration destination or not. The device ID column 12244 stores an identifier of the migration source storage device. The sector number column 12245 stores the sector number. The data column 12246 stores the data itself stored in the relevant sector.

FIG. 9 illustrates a conceptual diagram of the progress management table 1225. The progress management table 1225 stores the progress status of the transfer processing and information indicating whether data of the migration source, which should be transferred, has already been transferred to the migration destination or not. The progress management table 1225 is a table created by the administrator by executing a migration request operation via a user interface of the management device 3 and is used when a transfer control unit in a calculation node which is an offload location transfers data from the migration source to the migration destination.

Specifically speaking, the progress management table 1225 is constituted from a migration source storage device ID column 12251, a target data sector number column 12252, and a transfer flag column 12253.

The migration source storage device ID column 12251 stores an identifier of a migration source storage device (logical volume) storing transfer target data. The target data sector number column 12252 stores the sector number of the relevant sector where the transfer target data is stored. The transfer flag column 12253 stores a transfer flag indicating whether the transfer target data has been transferred or not.

Therefore, FIG. 8 shows that, for example, regarding the migration source storage device (logical volume) whose identifier is "LU10," the transfer flag indicates "Transferred" with respect to data stored in a sector with the sector number "1000" and, therefore, the data has already been transferred to the migration destination. On the other hand, since the transfer flag indicates "Not Transferred" with respect to data stored in a sector with the sector number "1500," it is shown that the data has not been transferred up until now and should be transferred.

(1-4) Flowcharts

Figure 10:
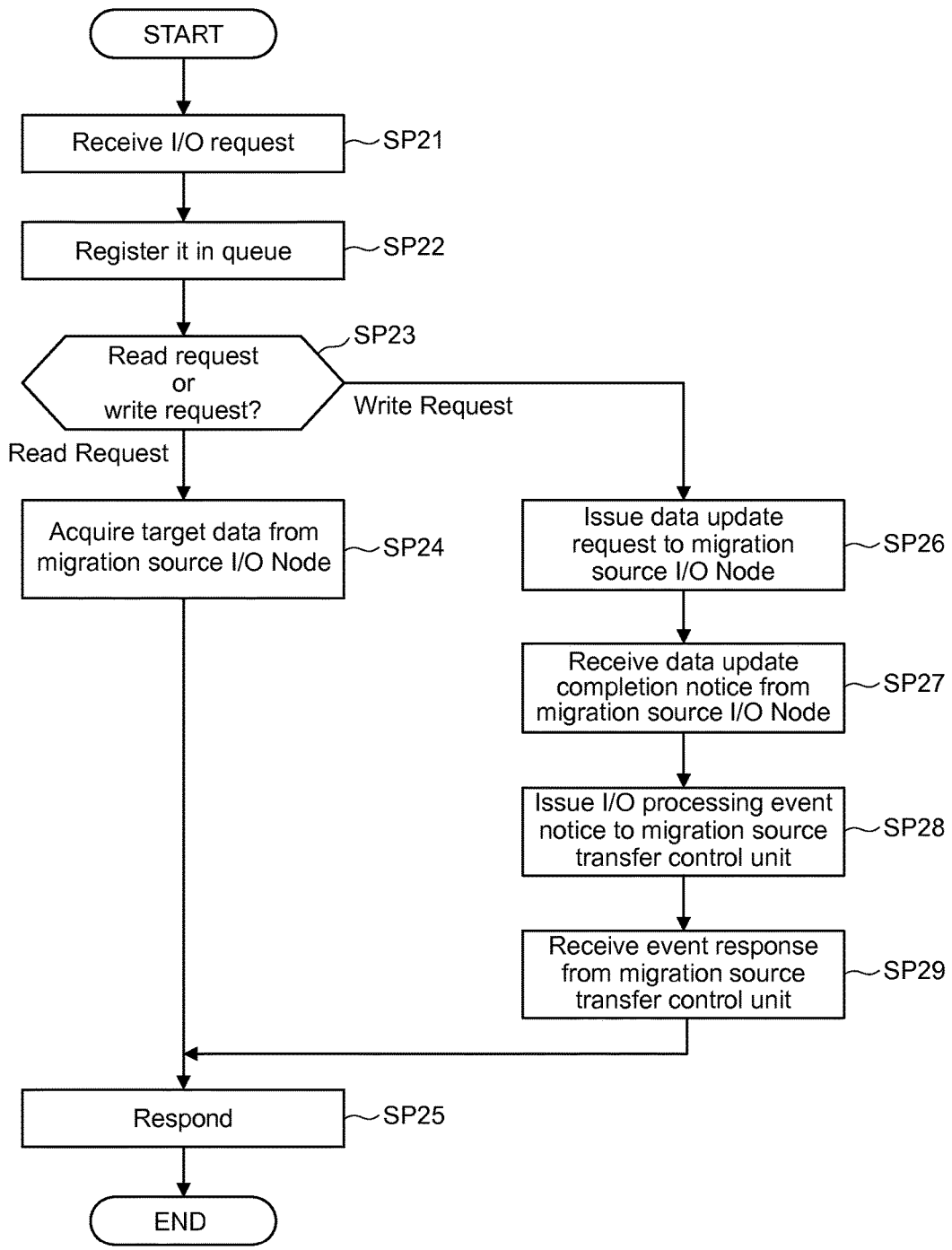
FIG. 10 is a flowchart illustrating I/O processing before application migration.

FIG. 10 illustrates a processing sequence for I/O processing before application migration. Specifically speaking, FIG. 10 illustrates a processing sequence for the I/O processing by the I/O control unit 1122 operating in the migration source calculation node 11. This I/O processing is executed based on control signals of the I/O control unit 1122 and the CPU 111 for the migration source as triggered by the receipt of an I/O request, which is issued from the application 1121 of the migration source, by the I/O control unit 1122 of the migration source. For the sake of convenience in explanation, the I/O control unit 1122 will be described as a processing subject.

Firstly, when the I/O control unit 1122 of the migration source receives an I/O request issued from the application 1121 of the migration source (SP21), it registers this I/O request in a queue (SP22). Then, the I/O control unit 1122 sequentially analyzes I/O requests registered in the queue and judges whether the relevant I/O request is a read request or a write request (SP23).

If the I/O request is a read request, the I/O control unit 1122 acquires read target data corresponding to the I/O request from the I/O node 13 of the migration source (SP24), issues a response to the I/O request to the application 1121 (SP25), and terminates this processing.

On the other hand, if the I/O request is a write request, the I/O control unit 1122 issues a data update request to the I/O node 13 of the migration source (SP26). After the I/O node 13 which has received this data update request updates (writes) update target data, the I/O node 13 issues a data update completion notice to the I/O control unit 1122. Then, the I/O control unit 1122 receives the data update completion notice issued from this I/O node 13 (SP27).

When the data is updated, the I/O control unit 1122 issues an I/O processing event notice to the transfer control unit 1223 of the migration source (SP28). Incidentally, the transfer control unit to which the I/O processing event notice is issued, that is, the calculation node which is the offload location is described here as the transfer control unit 1223; however, in practice, the transfer control unit 1223 is decided as the offload location by the management device 3 by referring to the aforementioned configuration management table 3211 in FIG. 3 and the resource allocation management table 3212 in FIG. 4, deciding, for example, a transfer control unit of a calculation node, which has the largest unused resource amount, in advance, and including this in a migration command.

The transfer control unit 1223 which has received the I/O processing event notice from the I/O control unit 1122 executes processing (event processing) corresponding to the I/O processing event notice and then issues an event response to the I/O control unit 1122. The details of the event processing will be explained later (FIG. 12B). Subsequently, after receiving the event response issued from the transfer control unit 1223 (SP29), the I/O control unit 1122 issues a response to the I/O request to the application 1121 (SP25) and terminates this processing.

Figure 11:
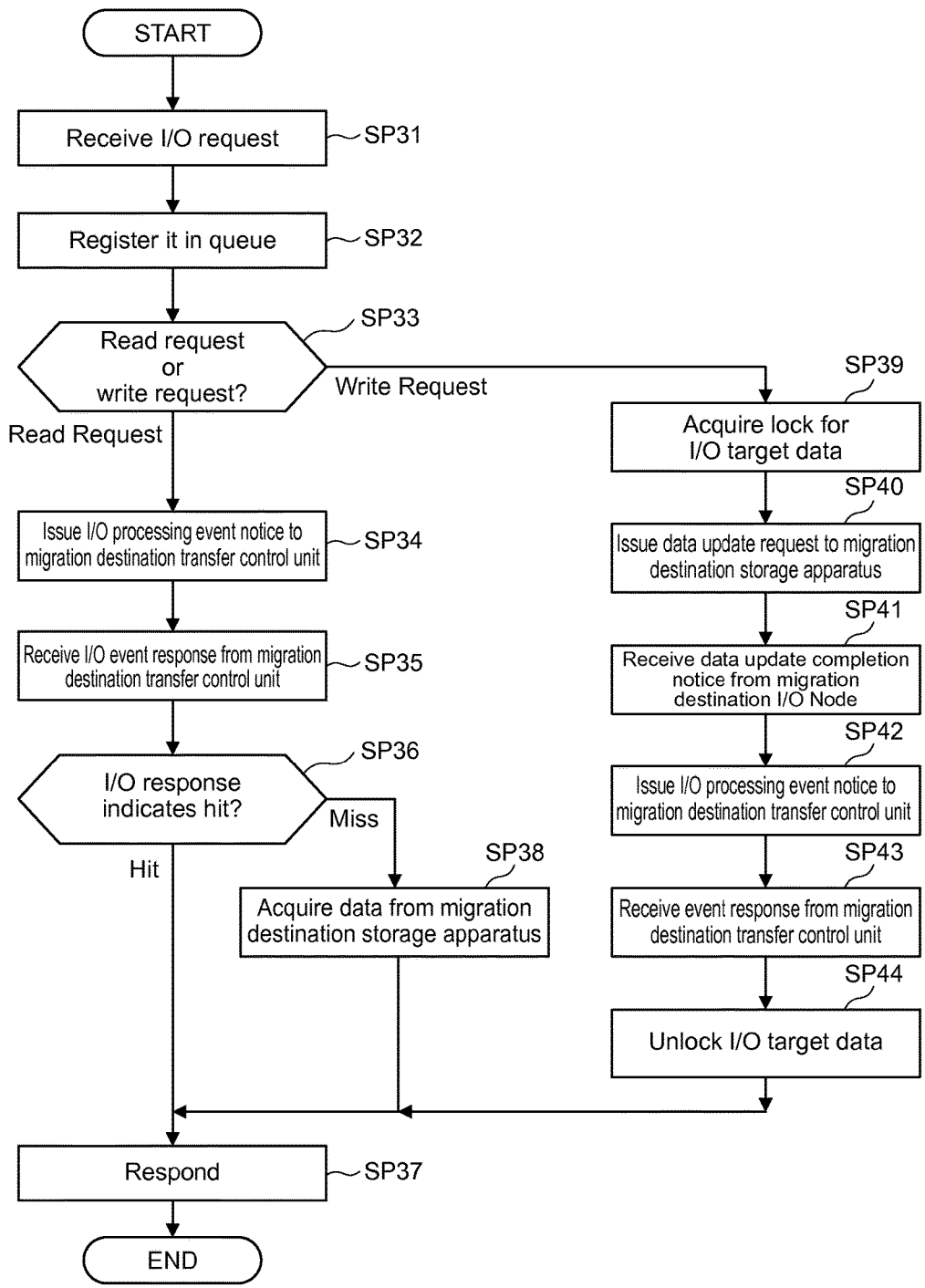
FIG. 11 is a flowchart illustrating I/O processing after the application migration.

FIG. 11 illustrates a processing sequence for I/O processing after the application migration. Specifically speaking, FIG. 11 illustrates a processing sequence for the I/O processing at the calculation node 22, which is the migration destination, after migrating the application 1121 of the migration source to the calculation node 22 which is the migration destination. Since the distance to the I/O node 23 changes before and after the migration of the application, it is necessary to also change an I/O path in order to streamline the I/O processing. Basically, an I/O request is issued to the I/O node 23 in the same chassis; however, the I/O processing is executed after synchronization with the transfer control unit 1223 of the migration source in order to ensure consistency with the data update associated with the migration processing.

This I/O processing is executed based on control signals of the I/O control unit 2222 and the CPU 211 for the migration destination as triggered by the receipt of an I/O request, which is issued from the application 2221 of the migration destination (an application which is the migrated application 1121 of the migration source), by the I/O control unit 2222. For the sake of convenience in explanation, the I/O control unit 2222 will be described as a processing subject.

Firstly, after receiving the I/O request issued from the application 2221 of the migration destination (SP31), the I/O control unit 2222 of the migration destination registers this I/O request in a queue (SP32). Then, the I/O control unit 2222 sequentially analyzes I/O requests registered in the queue and judges whether the relevant I/O request is a read request or a write request (SP33).

If the I/O request is a read request, the I/O control unit 2222 issues an I/O processing event notice to the transfer control unit 2123 of the migration destination (SP34). Then, the I/O control unit 2222 receives an event response issued from the transfer control unit 2123 of the migration destination (SP35).

The I/O control unit 2222 refers to the received event response and judges whether read target data corresponding to the I/O request is stored in the I/O node 13 of the migration source (hit) or not (SP36).

If the I/O control unit 2222 obtains a hit result for this judgment, it fetches I/O target data from the event response, generates an I/O response, issues it to the migration destination application 2221 (SP37), and terminates this processing.

On the other hand, if the I/O control unit 2222 obtains a miss result for the judgment in step SP36, this means that the read target data corresponding to the I/O request is stored in the I/O node 23 of the migration destination, and the I/O control unit 2222 thereby acquires the read target data from the I/O node 23 of the migration destination (SP38). Then, the I/O control unit 2222 issues an I/O response to the application 2221 of the migration destination (SP37) and terminates this processing.

On the other hand, if the I/O request is a write request as a result of the judgment in step SP33, the I/O control unit 2222 executes I/O target data lock acquisition processing on the migration destination I/O node 23 (SP39). Subsequently, the I/O control unit 2222 issues a data update request to the I/O node 23 of the migration destination (SP40). When the I/O node 23 which has received this data update request updates (writes) update target data, the I/O node 23 issues a data update completion notice to the I/O control unit 2222. Then, after receiving the data update completion notice issued from this I/O node 23 (SP41), the I/O control unit 2222 issues an I/O processing event notice to the transfer control unit 2123 of the migration destination (SP42).

After receiving this I/O processing event notice, the transfer control unit 2123 of the migration destination issues an event response to the I/O control unit 2222. Then, the I/O control unit 2222 receives the event response from the transfer control unit 2123 (SP43).

After receiving the event response, the I/O control unit 2222 unlocks the I/O target data acquired in step SP39 (SP44), then issues a response to the I/O request to the application 2221 of the migration destination (SP37), and terminates this processing.

Figure 12A:
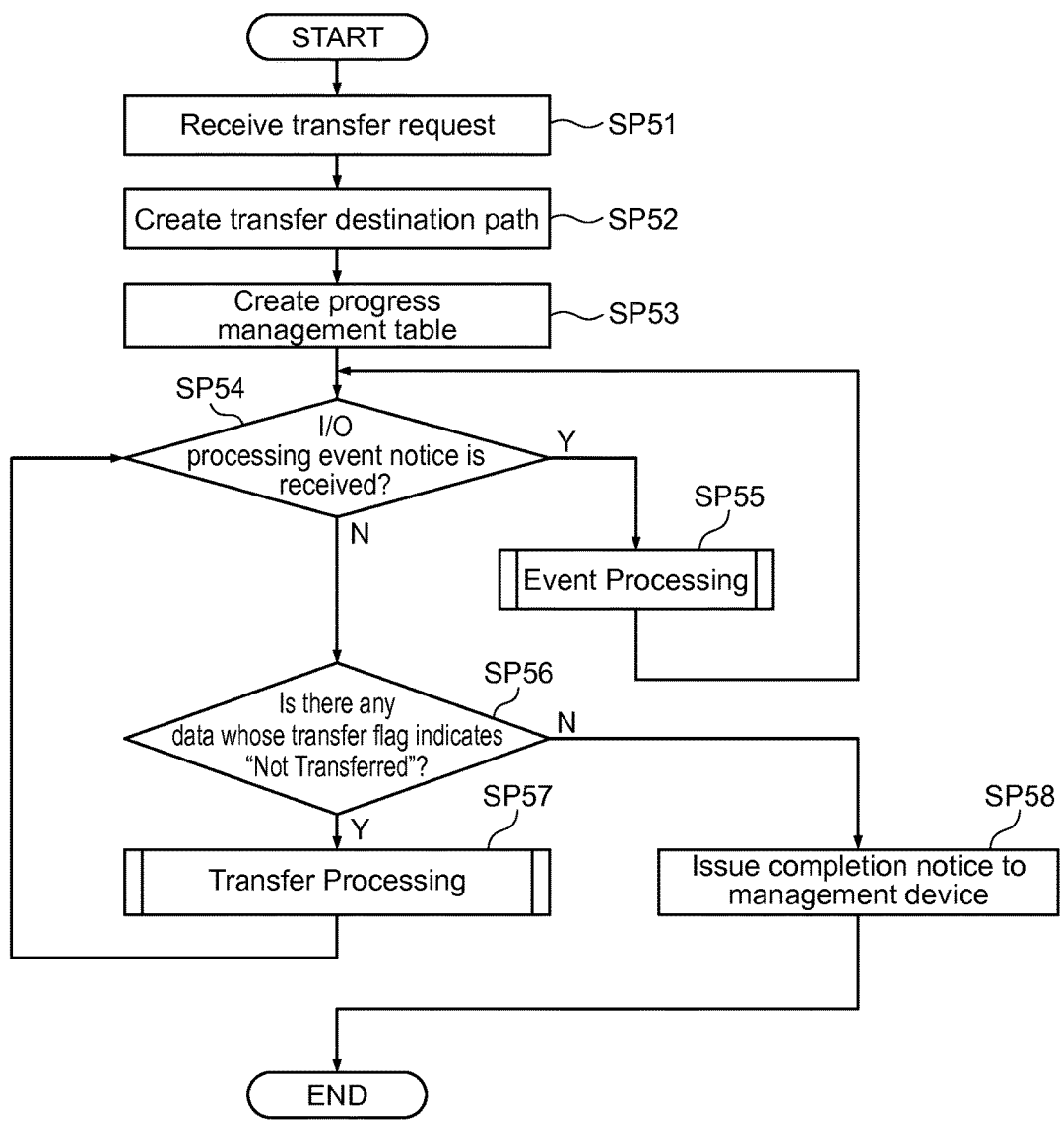
FIG. 12A is a flowchart illustrating event processing and transfer processing at a migration source.
Figure 12B:
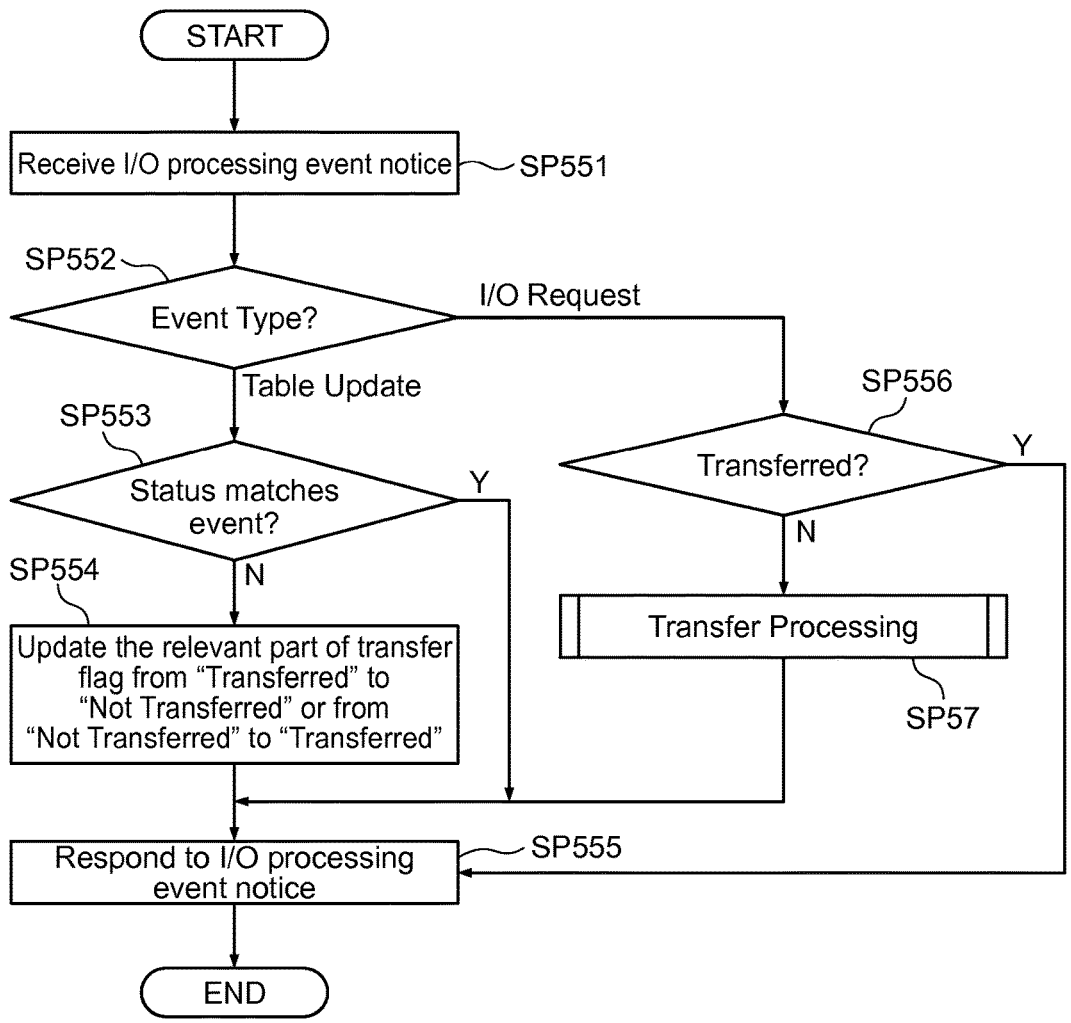
FIG. 12B is a flowchart illustrating event processing at the migration source.

FIG. 12A illustrates a processing sequence for event processing and transfer processing at the migration source. Specifically speaking, FIG. 12A illustrates a processing sequence for the event processing and the transfer processing at the calculation node 12. The event processing and the transfer processing are executed based on control signals of the transfer control unit 1223 and the CPU 121 for the migration source as triggered by the receipt of a transfer request, which is issued from the management device 3, by the transfer control unit 1223 of the migration source. For the sake of convenience in explanation, the transfer control unit 1223 will be described as a processing subject.

Firstly, after the transfer control unit 1223 of the migration source receives the transfer request issued from the management device 3 (SP51), it establishes a connection with the transfer control unit 2123 of the migration destination based on this transfer request and creates a transfer destination path (SP52). Then, the transfer control unit 1223 refers to the disk management table 3213 (FIG. 5) and creates the progress management table 1225 (FIG. 9) (SP53).

Specifically speaking, the transfer control unit 1223 refers to the disk management table 3213, acquires the sector number of the I/O node 13 designated by the transfer request from the management device 3, enters the result of dividing the value by a transfer unit (for example, by 1) in the target data sector number column 12252, and initializes all transfer flags to "Not Transferred."

Incidentally, the transfer control unit 1223 uses the progress management table 1225 as a transfer queue and selects data in the table sequentially from the top to down in order as transfer target data. Furthermore, if there is any data to be prioritized and transferred, the data selection is controlled by switching the order of rows.

The transfer control unit 1223 judges whether the I/O processing event notice from the I/O control unit 1122 is received or not (SP54). If the transfer control unit 1223 obtains an affirmative result for this judgment, it executes the event processing (SP55) and then returns to step SP54. On the other hand, if the transfer control unit 1223 obtains a negative judgment result in step SP54, it judges whether or not the transfer flag column 12253 in the progress management table 1225 indicates that there is any "Not Transferred" data (SP56).

If the transfer control unit 1223 obtains an affirmative result for this judgment, it executes the transfer processing (SP57) and then returns to step SP54. If the transfer control unit 1223 obtains a negative judgment result in step SP56 as a result of repeating the transfer processing, it determines that all the pieces of data which should be transferred have been transferred, issues a completion notice to the management device 3 (SP58), and terminates this processing.

<Event Processing>

FIG. 12B illustrates a processing sequence for the event processing at the calculation node 12 of the migration source.

After receiving an I/O processing event notice (SP551), the transfer control unit 1223 firstly judges the content of the event type (SP552).

Then, if the content of the event type is a "table update," the transfer control unit 1223 compares the target data sector number column 11243 of the event table 1124 included in the received I/O processing event notice with the target data sector number column 12252 of the progress management table 1225 and judges whether or not the comparison result matches a transfer flag corresponding to the sector number range designated by the event table 1124 (SP553).

If the transfer control unit 1223 obtains a negative result for this judgment, it updates the transfer flag(s) in the relevant part of the progress management table 1225 where such transfer flag(s) does not match the event table 1124, to a value designated in the transfer flag column 11244 of the event table 1124 (SP554); then issues an event response to the I/O control unit 1122 of the migration source or the I/O control unit 2222 of the migration destination which issued the I/O processing event notice (SP555); and terminates this processing.

Incidentally, when this happens, the transfer control unit 1223 registers an entry of the progress management table 1225, whose transfer flag has been updated to "Not Transferred" (data to be transferred), at the beginning of the queue. Since the data reported by the I/O processing event notice is cached (or staged) to the memory in the I/O node 13 of the migration source, it is possible to streamline the transfer processing.

On the other hand, if the transfer control unit 1223 obtains an affirmative judgment result in step SP553, it proceeds to step SP555, issues an event response to the I/O control unit 1122 of the migration source or the I/O control unit 2222 of the migration destination which issued the I/O processing event notice (SP555), and terminates this processing.

Furthermore, if the request content judged in step SP552 is an "I/O request," the transfer control unit 1223 judges whether the target data has been transferred or not, by using the progress management table 1225 (SP556). If the transfer control unit 1223 obtains a negative judgment result in step SP556, it executes the transfer processing (SP57). Then, the transfer control unit 1223 issues an untransferred I/O processing event response including the acquired data (SP555) and terminates this processing. On the other hand, if the transfer control unit 1223 obtains an affirmative judgment result in step SP556, it issues a transferred I/O processing event response (SP555) and terminates this processing.

<Transfer Processing>

Figure 12C:
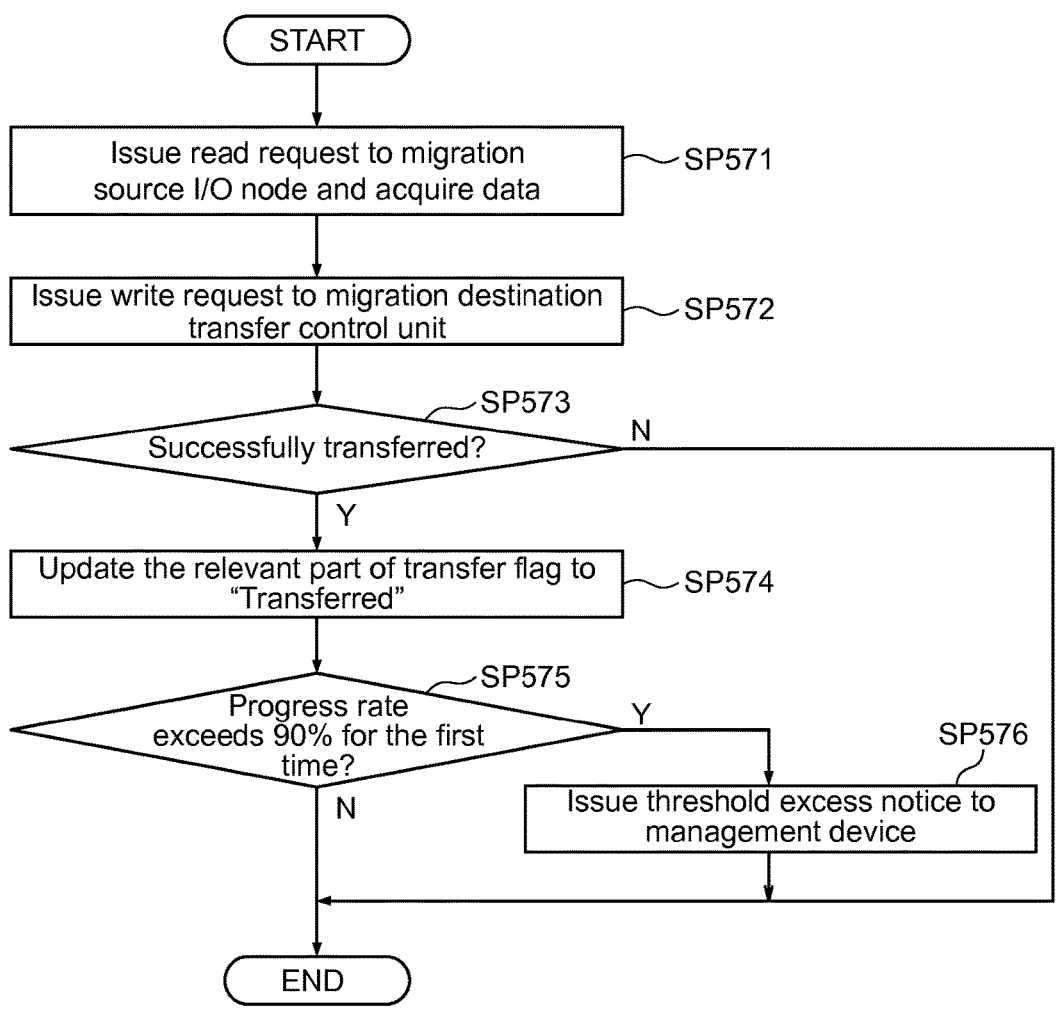
FIG. 12C is a flowchart illustrating transfer processing at the migration source.

FIG. 12C illustrates a processing sequence for transfer processing at the calculation node 12 of the migration source.

Firstly, the transfer control unit 1223 selects transfer target data by referring to the progress management table 1225, issues a read request to the I/O node 13 of the migration source, and acquires data to be transferred (SP571).

Incidentally, when this happens, the transfer control unit 1223 acquires the data, which should be transferred, from the I/O node 13 of the migration source without caching (or staging) the data. It is possible to prevent degradation of the I/O processing performance by the I/O control unit 1122 by not caching the data. Subsequently, the transfer control unit 1223 issues a transfer request to transfer the acquired data to the transfer control unit 2123 of the migration destination (SP572).

The transfer control unit 1223 judges whether the data has been successfully transferred or not, by referring to a response from the transfer control unit 2123 (SP573). If the transfer control unit 1223 obtains a negative result for this judgment, it proceeds to step SP54 and repeats the transfer processing. On the other hand, if the transfer control unit 1223 obtains an affirmative result for this judgment, it updates the transfer flag in the relevant part of the progress management table 1225, where the data was successfully transferred, to "Transferred" (SP574).

Then, the transfer control unit 1223 judges whether or not a rate of the transferred data among the data which are entered in the progress management table 1225 and should be transferred (progress rate) has exceeded 90% for the first time (SP575). If the transfer control unit 1223 obtains a negative result for this judgment, it terminates the processing. On the other hand, if the transfer control unit 1223 obtains an affirmative result for this judgment, it issues a threshold excess notice to the management device 3 (SP576) and terminates this processing.

Incidentally, after receiving the threshold excess notice issued from the transfer control unit 1223, the management device 3 issues a command to the migration source calculation node 11 to migrate the application 1121.

Incidentally, if a failure occurs in the calculation node 12 while the transfer processing is being executed by the transfer control unit 1223, the transfer processing may be executed again from the beginning by another calculation node included in the migration source storage system 1 and not shown in the drawing. Furthermore, the transfer control unit 1223 may periodically notify the migration management unit 321 of the progress management table 1225; and when a failure occurs in the calculation node 12, the transfer control unit 1223 may send the progress management table 1225 to another calculation node and execute the transfer processing again from the middle of the processing.

Figure 13A:
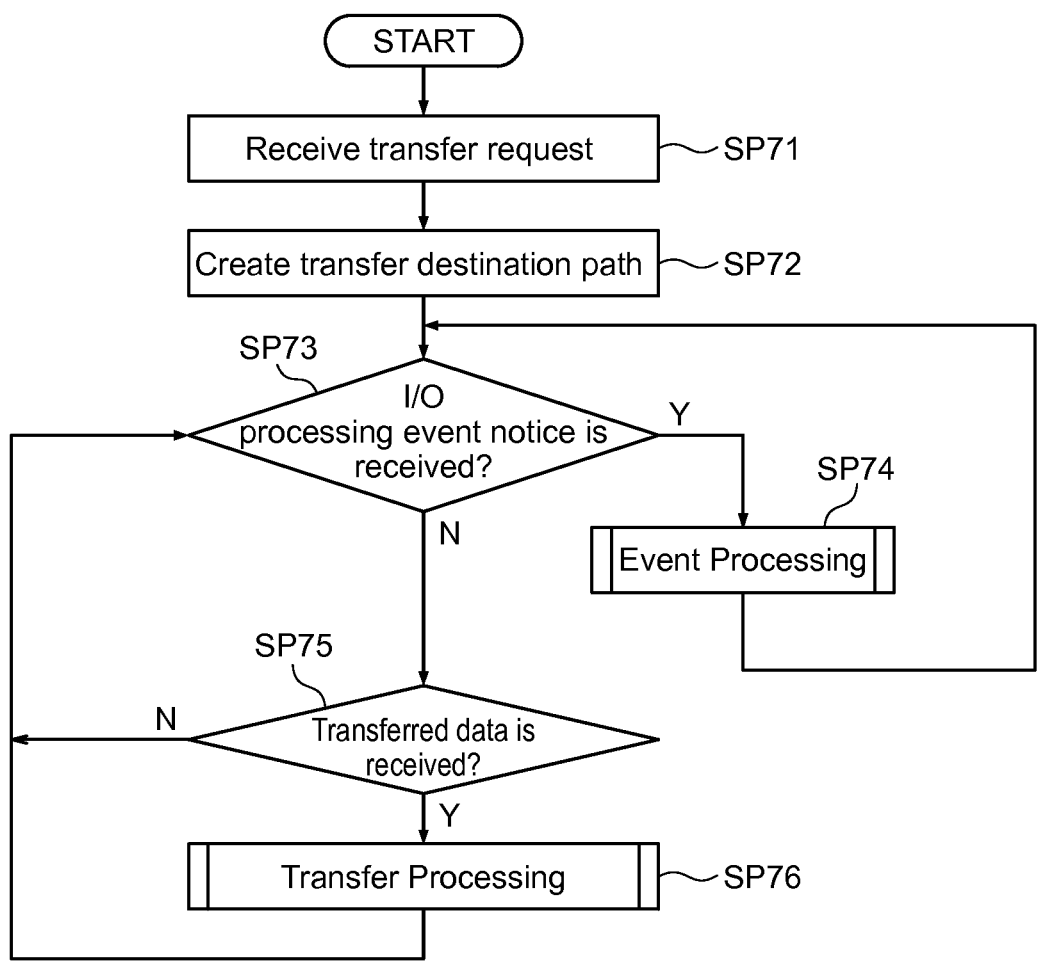
FIG. 13A is a flowchart illustrating event processing and transfer processing at a migration destination.

FIG. 13A illustrates a processing sequence for the event processing and the transfer processing at the migration destination. Specifically speaking, FIG. 13A illustrates a processing sequence for the transfer processing at the calculation node 21 of the migration destination when data is transferred from the migration source. This transfer processing is executed based on control signals of the transfer control unit 2123 and the CPU 211 for the migration destination as triggered by the receipt of a migration command, which is issued from the management device 3, by the transfer control unit 2123 of the migration destination. For the sake of convenience in explanation, the transfer control unit 2123 will be described as a processing subject.

Firstly, after receiving the transfer request issued from the management device 3 (SP71), the transfer control unit 2123 of the migration destination creates a transfer path to the transfer control unit 1223 of the migration source (SP72) and judges whether an I/O processing event notice from the I/O control unit 2222 is received or not (SP73). If the transfer control unit 2123 obtains an affirmative result for this judgment, it executes the event processing (SP74) and then returns to step SP73.

On the other hand, if the transfer control unit 2123 of the migration destination obtains a negative judgment result in step SP73, it judges whether the transferred data is received or not (SP75). If the transfer control unit 2123 of the migration destination obtains an affirmative result for this judgment, it executes the processing for transferring the data to the I/O node 23 (SP76) and then returns to step SP73.

On the other hand, if the transfer control unit 2123 of the migration destination obtains a negative judgment result in step SP75, it returns to step SP73.

<Event Processing>

Figure 13B:
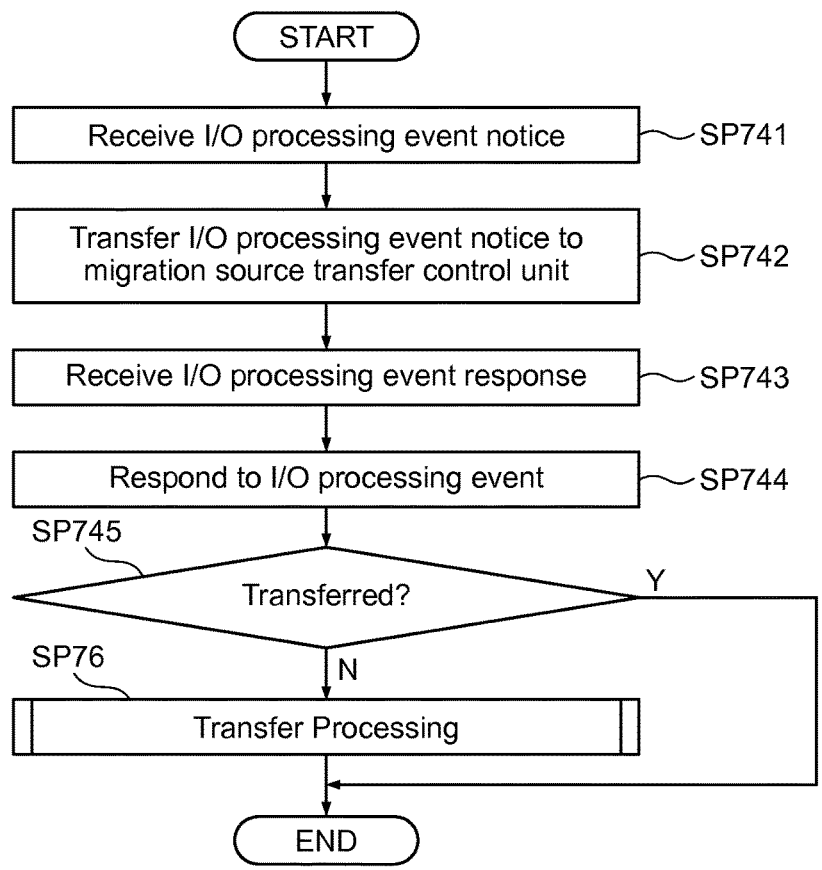
FIG. 13B is a flowchart illustrating event processing at the migration destination.

FIG. 13B illustrates a processing sequence for the event processing at the calculation node 21 of the migration destination.

After receiving an I/O processing event notice (SP741), the transfer control unit 2123 of the migration destination transfers the received I/O processing event notice to the transfer control unit 1223 of the migration source (SP742) and receives an I/O processing event response as the result (SP743).

After issuing the I/O processing event response to the I/O control unit 2222 (SP744), the transfer control unit 2123 of the migration destination checks the transfer status column 12243 of the received I/O processing event response and judges whether the requested target data of the I/O processing event notice has been transferred or not (SP745).

If the transfer control unit 2123 of the migration destination obtains an affirmative result for this judgment, it terminates the processing; and if the transfer control unit 2123 of the migration destination obtains a negative result for this judgment, it executes processing for transferring the data to the I/O node 23 (SP76) and terminates the processing.

<Transfer Processing>

Figure 13C:
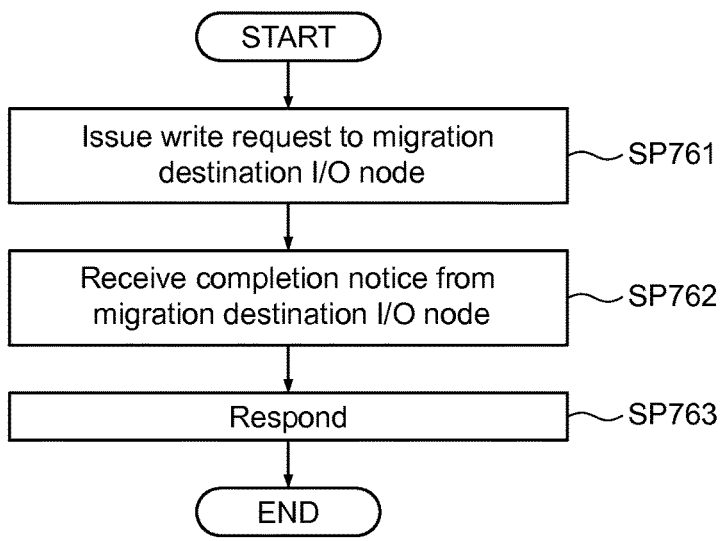
FIG. 13C is a flowchart illustrating transfer processing at the migration destination.

FIG. 13C illustrates a processing sequence for the transfer processing at the calculation node 21 of the migration destination.

The transfer control unit 2123 of the migration destination issues a write request to a storage area of the I/O node 23 of the migration destination corresponding to a migration destination storage device ID and sector number designated by a write request or I/O processing event response from the transfer control unit 1223 of the migration source (SP761).

The I/O node 23 which has received the write request stores data, which has been transferred from the transfer control unit 2123, in the storage device 232; and after completing storing all the pieces of data, the I/O node 23 issues a completion notice to the transfer control unit 2123.

After receiving the completion notice issued form the I/O node 23 of the migration destination (SP762), the transfer control unit 2123 issues a response to the transfer request to the management device 3 (SP763) and terminates this processing.

Figure 14:
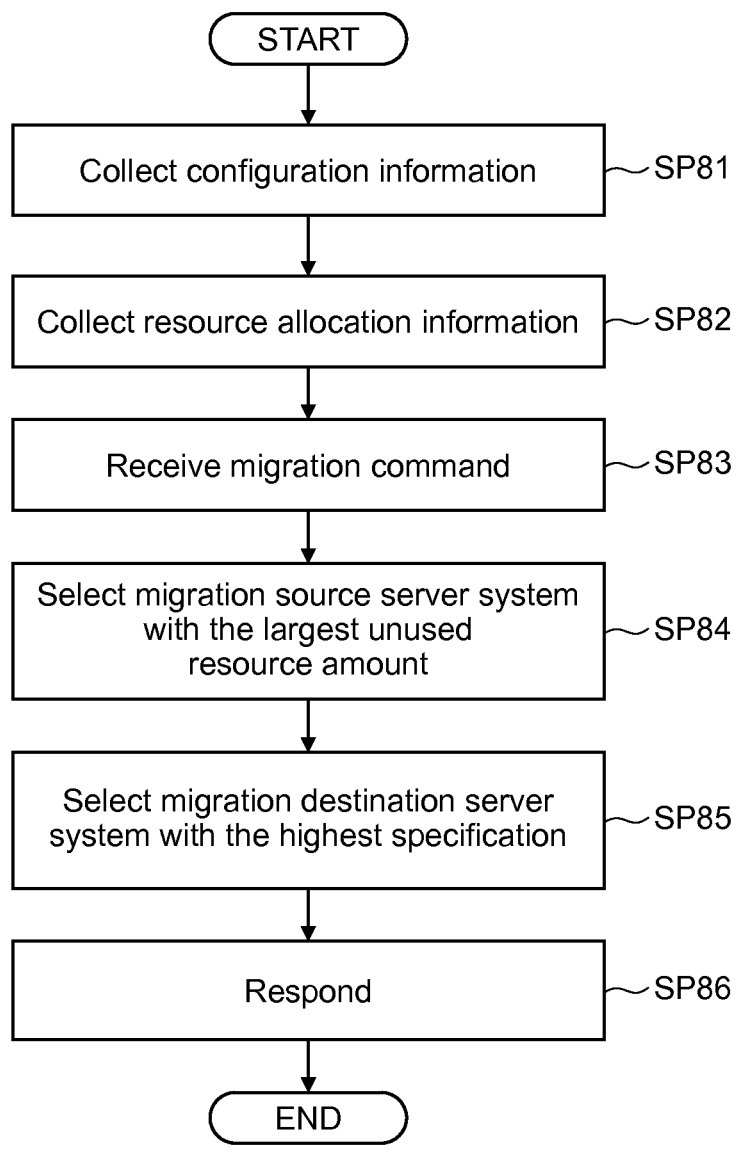
FIG. 14 is a flowchart illustrating arrangement selection processing.

FIG. 14 illustrates a processing sequence for arrangement selection processing. This arrangement selection processing is executed based on control signals of the migration management unit 321 and the CPU 31 for the management device 3 periodically or as triggered by the receipt of a migration command, which is issued from the administrator, by the management device 3. For the sake of convenience in explanation, the migration management unit 321 will be described as a processing subject.

Firstly, the migration management unit 321 periodically collects configuration information from a plurality of calculation nodes and I/O nodes included in the storage systems 1 and 2 (SP81). Moreover, the migration management unit 321 collects resource allocation information from the resource allocation management unit (SP82). Incidentally, the migration management unit 321 stores and manages the then collected configuration information and resource allocation information in the configuration management table 3211 in FIG. 3 and the resource allocation management table 3212 in FIG. 4.

Next, when the migration management unit 321 receives a migration command from the administrator via a user interface (not shown in the drawing), a migration command which is periodically issued, or a migration command which is previously scheduled and registered (SP83), it refers to the configuration management table 3211 and the resource allocation management table 3212, calculates an unused resource amount, and selects the calculation node 12 of the migration source with the largest calculated unused resource amount as a calculation node which is an offload location for the transfer processing (SP84).

When evaluating the unused resource amount, the migration management unit 321 adds, for example, a sum of the clock frequency×the number of cores of an unused CPU at one calculation node and a sum of the number of unused network I/Fs×bandwidth and evaluates the result of the addition as the unused resource amount. Incidentally, the evaluation of the unused resource amount is not limited to this example and the unused resource amount may be evaluated based on separately collected load information in consideration of an actually used amount.

Subsequently, the migration management unit 321 refers to the configuration management table 3211 and selects the calculation node 21 with the highest hardware specification as a calculation node of the migration destination (SP85).

Then, the migration management unit 321 issues an activation request to each calculation node to activate the I/O control unit and the transfer control unit, further notifies them of their identification numbers to enable them to communicate with each other (for example, IP addresses) and an identifier of a migration target storage device, then responds to the migration command by, for example, displaying the selection result on a display screen (not shown in the drawing) of the management device 3 (SP86), and terminates this processing.

Specifically speaking, the I/O control unit 1122 of the migration source is notified of the IP address of the migration source transfer control unit 1223, the I/O control unit 2222 of the migration destination is notified of the IP address of the migration destination transfer control unit 2123, the transfer control unit 1223 of the migration source is notified of the IP address of the migration destination transfer control unit 2123 and the migration source storage device ID, and the transfer control unit 2123 of the migration destination is notified of the IP address of the migration source transfer control unit 1223 and the migration destination storage device ID.

Incidentally, the migration destination calculation node is selected based on the hardware specification in this example; however, the basis for such selection is not limited to this example and the migration destination calculation node may be selected based on the unused resource amount in the same manner as the selection of the migration source calculation node. Moreover, one migration source calculation node and one migration destination calculation node are selected in this example; however, the number of such calculation nodes is not limited to this example and, for example, a plurality of calculation nodes may be selected as migration source calculation nodes and the transfer processing may be offloaded to these calculation nodes and then executed in parallel. Also, a different transfer path may be selected for each application for the purpose of security enhancement.

Furthermore, if there is a network path through which the I/O node 13 of the migration source and the I/O node 23 of the migration destination directly communicate with each other, the management device 3 may collect the configuration information and the resource allocation information about the I/O node 13 of the migration source and the I/O node 23 of the migration destination and allocate the transfer control unit 1223 of the migration source and the transfer control unit 2123 of the migration destination as execution locations of the migration source I/O node 13 and the I/O node 23, respectively.

(1-5) Advantageous Effects According to First Embodiment

Since the converged system 100 according to this embodiment is designed so that the transfer processing can be offloaded to another calculation node 12 different from the calculation node 11 in which the application 1121 operates, it is possible to reduce loads on the calculation node 11 and the I/O node 13 and prevent the delay of the transfer processing. Moreover, when the calculation node 11 executes the I/O processing, it issues an I/O processing event notice to the calculation node 12; and, therefore, data consistency between the migration source and the migration destination can be ensured. As a result, it is possible to prevent performance degradation of the entire converged system 100 and execute the migration processing appropriately.

(2) Second Embodiment

The difference between the second embodiment and the first embodiment is that in the second embodiment, a management device includes a transfer management unit, a migration source calculation node includes a device virtualization unit, and a migration destination calculation node includes a data transfer unit. Moreover, data is transferred from a migration source to a migration destination actually in the same manner as in the first embodiment by using the transfer management unit, the device virtualization unit, and the data transfer unit; however, the second embodiment is different from the first embodiment because such data transfer is to be recognized by the administrator as local copying within the migration source storage system. The details of a converged system and a storage system migration method according to this embodiment will be explained below. Incidentally, the same reference numerals are given to the same elements in the second embodiment as those of the first embodiment and an explanation about them has been omitted and different elements will be explained.

(2-1) Outline of this Embodiment

Figure 15:
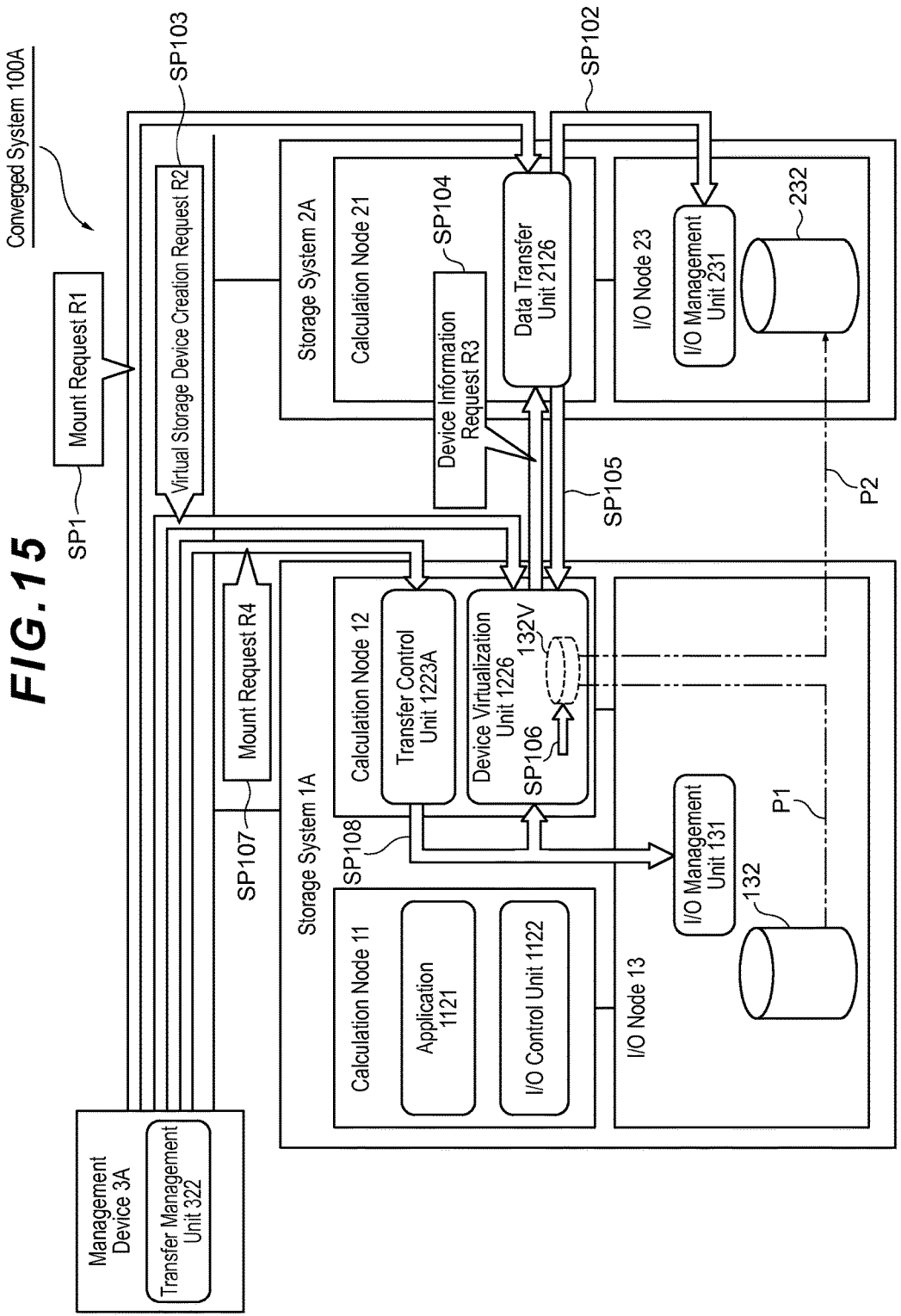
FIG. 15 is a schematic diagram for explaining the outline of transfer path construction processing according to a second embodiment.
Figure 16:
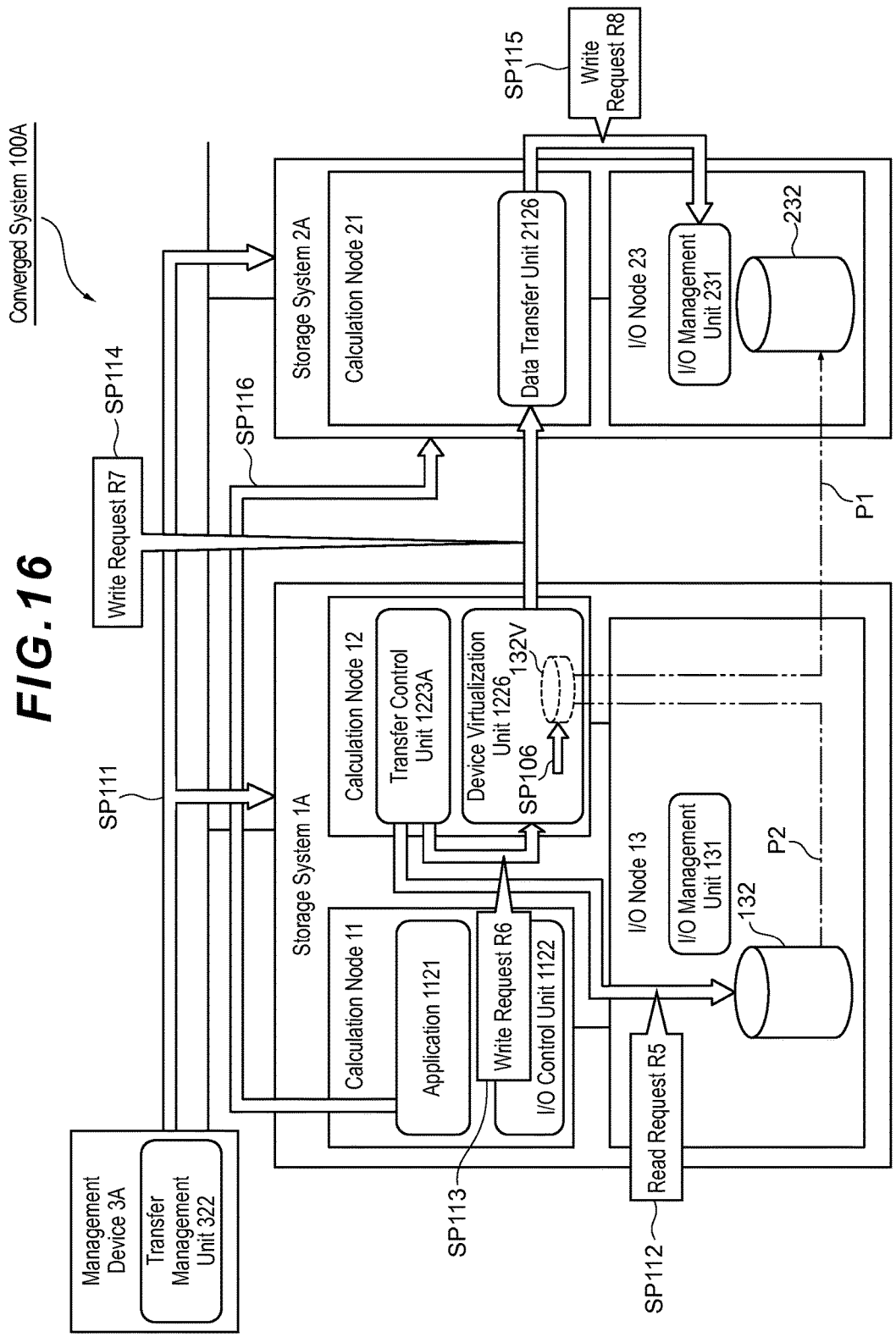
FIG. 16 is a schematic diagram for explaining the outline of transfer processing according to a second embodiment.

FIG. 15 illustrates a schematic diagram of transfer path construction processing according to this embodiment. Moreover, FIG. 16 illustrates a schematic diagram of migration processing according to this embodiment. This embodiment is premised on separating I/O processing from transfer processing in the migration source storage system 1A as explained in the first embodiment. Furthermore, this embodiment is intended to enhance transfer processing performance for the administrator by dividing the transfer processing into three processes, that is, transfer control processing, device virtualization processing, and data transfer processing.

Firstly, the outline of the transfer path construction processing according to this embodiment will be explained with reference to FIG. 15. This transfer path construction processing creates a path for transferring data from the migration source storage device to the migration destination storage device via a virtualized storage device.

Specifically speaking, after receiving a storage system migration command from the administrator, a management device 3A firstly has a transfer management unit 322 create a transfer path and then issues a mount request R1 to the calculation node 21 of the migration destination selected as the path to mount the storage device 232 (FIG. 18) (SP101).

The calculation node 21 which has received the mount request R1 has a data transfer unit 2126 mount the storage device 232 (SP102). Incidentally, after completing mounting the storage device 232, the data transfer unit 2126 issues a mount completion response to the management device 3A.

After receiving the mount completion response from the data transfer unit 2126, the management device 3A issues a virtual storage device creation request R2 (FIG. 19) to a device virtualization unit 1226 in the calculation node 12 of the migration source selected as the transfer path by the transfer management unit 322 (SP103). This virtual storage device creation request R2 can be described briefly as a request to create a virtualized storage device (hereinafter referred to as the virtual storage device) 132V in the calculation node 12.

The device virtualization unit 1226 which has received the virtual storage device creation request R2 acquires information about the storage device 232 by issuing a device information request R3 (not shown in the drawing) to the data transfer unit 2126 (SP104). After receiving the device information request R3, the data transfer unit 2126 issues identification information about the migration destination storage device 232 and information indicating the capacity of the migration destination storage device 232 as a response to the device information request R3 to the device virtualization unit 1226 (SP105).

Then, after receiving the response to the device information request R3 issued from the data transfer unit 2126, the device virtualization unit 1226 creates the virtual storage device 132V associated with the migration destination storage device 232 based on the received response (SP106).

When accessing the virtual storage device 132V in the calculation node 12 after executing this processing, all the pieces of information can be transferred to the storage device 232 of the I/O node 23.

Subsequently, the management device 3A issues a mount request R4 (FIG. 21) to the calculation node 12 of the migration source to mount the storage device 132 and the virtual storage device 132V (SP107).

The calculation node 12 which has received the mount request R4 has the transfer control unit 1223A mount the migration source storage device 132 and the virtual storage device 132V (SP108). Incidentally, after completing mounting them, the transfer control unit 1223A issues a mount completion response to the management device 3A. As a result, the transfer path construction processing according to this embodiment is completed.

In this way, the transfer path construction processing according to this embodiment can construct the transfer path P1 for connecting the migration source storage device 132 and the virtual storage device 132V and construct the transfer path P2 for connecting the virtual storage device 132V and the migration destination storage device 232.

Next, the outline of migration processing according to this embodiment will be explained with reference to FIG. 16. This migration processing is to transfer data through the transfer path constructed by the transfer path construction processing in FIG. 15.

Specifically speaking, when the management device 3A first receives a storage system migration command from the administrator on the premise that it periodically acquires and centrally manages configuration information from each of the storage systems 1A and 2A, it issues a migration command to the migration source storage system 1A and the migration destination storage system 2A based on the received migration command and the centrally managed configuration information (SP111).

The migration source storage system 1A which has received the migration command has the transfer control unit 1223A issue a read request R5 (FIG. 22) to the storage device 132 in the I/O node 13 of the migration source (SP112).

The I/O node 13 which has received the read request transfers data corresponding to the read request from the storage device 132, that is, transfer target data, to the transfer control unit 1223A.

Having acquired the transfer target data from the I/O node 13, the transfer control unit 1223A issues a write request R6 (FIG. 23) to the virtual storage device 132V via the device virtualization unit 1226 (SP113).

Incidentally, this processing in step SP113 makes it possible to transfer the transfer target data from the storage device 132 to the virtual storage device 132V.

After receiving the write request R6, the device virtualization unit 1226 identifies a storage device corresponding to the virtual storage device 132V and a transfer destination and issues a write request R7 (FIG. 24) to the data transfer unit 2126 of the migration destination which is the identified transfer destination (SP114).

The data transfer unit 2126 of the migration destination which has received the write request R7 issues a write request R8 to the storage device 232 (SP115).

Finally, the operation environment of the application 1121 which operates in the migration source calculation node 11 is migrated to the calculation node 22 which is the migration destination (FIG. 17) (SP116), thereby completing the migration processing according to this embodiment.

This embodiment described above is configured so that the virtual storage device 132V is placed in the migration source storage system 1A and the transfer target data is transferred via this virtual storage device 132V from the migration source storage device 132 to the migration destination storage device 232. Therefore, the processing of the transfer control unit 1223A can be implemented by means of the data copying function between the storage devices directly connected to the calculation node 12. So, it is possible to realize data migration by means of a combination of the copy function of the OS and the higher-level copy function provided by, for example, commercially available backup software.

Moreover, the function of the transfer control unit 1223 according to the first embodiment is divided into three functions and the transfer control unit 1223A, the device virtualization unit 1226, and the data transfer unit 2126 are made to take charge in the divided three functions respectively, so that it is possible to distribute the loads. The details of the converged system and the storage system migration method according to this embodiment will be explained below.

(2-2) Overall Configuration

FIG. 17 illustrates an overall configuration of a converged system 100A according to the second embodiment. The converged system 100A is composed of storage systems 1A, 2A and a management device 3A and the storage system 1A is composed of the calculation nodes 11, 12 and the I/O node 13. Then, the calculation node 12 of the migration source which becomes an offload location for transfer processing is configured by storing a transfer control unit 1223A, a device virtualization unit 1226, and a storage device correspondence table 1227 in a memory 122.

Other elements of the calculation nodes 12 and 21 are the same as those of the calculation nodes 12 and 21 according to the first embodiment. Moreover, the calculation nodes 11 and 22 have the same elements as those of the calculation nodes 11 and 22 according to the first embodiment.

The management device 3A is configured by storing a transfer management unit 322 in a memory 32A. After receiving a migration command from the administrator, the transfer management unit 322 executes, for example, the transfer path construction processing shown in FIG. 15. Other elements of the management device 3A are the same as those of the management device 3 according to the first embodiment.

(2-3) Details of Various Table Structures

FIG. 18 illustrates a conceptual diagram of the mount request R1. The mount request R1 is a request issued by the management device 3A to the calculation node 21 of the migration destination during the transfer path construction processing shown in FIG. 15 and is a request made in order to make the calculation node 21 recognize the storage device 232.

The mount request R1 is constituted from an I/O node ID area R11 and a storage device ID area R12; and the I/O node ID area R11 stores an identifier of the I/O node 23 to be mounted. Moreover, the storage device ID area R12 stores an identifier of the storage device (logical volume) 232 to be mounted.

Accordingly, FIG. 18 shows, for example, a mount request to the I/O node 23 whose identifier is "Storage 1B" to mount the storage device (logical volume) 232 whose identifier is "LU20."

FIG. 19 illustrates a conceptual diagram of the virtual storage device creation request R2. The virtual storage device creation request R2 is a request issued by the management device 3A to the calculation node 12 of the migration source during the transfer path construction processing shown in FIG. 15 and is a request made to make the calculation node 12, which is the offload location, to create the virtual storage device 132V.

The virtual storage device creation request R2 is constituted from a migration destination data transfer address area R21, an I/O node ID area R22, and a storage device ID area R23. The migration destination data transfer address area R21 stores an address of the data transfer unit 2126 of the migration destination, the I/O node ID area R22 stores an identifier of the I/O node 23 of the migration destination, and the storage device ID area R23 stores an identifier of the storage device 232 of the migration destination.

Accordingly, FIG. 19 shows, for example, the request to create the virtual storage device 132V in order to associate it with the storage device 232 "LU20" of the I/O node 23 for "Storage 1B" which is connected to the data transfer unit 2126 whose address is "192.168.1.2."

FIG. 20 illustrates a conceptual diagram of the storage device correspondence table 1227. The storage device correspondence table 1227 stores information indicating a correspondence relationship between the created virtual storage device 132V and the storage device 232. The storage device correspondence table 1227 is a table created when the device virtualization unit 1226 creates the virtual storage device 132V; and the storage device correspondence table 1227 is used when the transfer control unit 1223A in the calculation node 12, which is the offload location, transfers data from the migration source to the migration destination.

Specifically speaking, the storage device correspondence table 1227 is constituted from: an I/O node ID column 12271 and a storage device ID column 12272 which indicate identification information about a virtual storage device; and a transfer destination data transfer address column 12273, an I/O node ID column 12274, and a storage device ID column 12275 which indicate identification information about a physical storage device.

Accordingly, FIG. 20 shows that, for example, a virtual storage device "LU21" created in the "calculation node 2A" actually corresponds to a physical device "LU20" in the "I/O node 1B" and the device virtualization unit which created this virtual storage device will transfer data to the data transfer unit of the transfer destination by using the address "192.168.1.2."

FIG. 21 illustrates a conceptual diagram of the mount request R4. The mount request R4 is a request issued by the management device 3A to the transfer control unit 1223A of the migration source during the transfer path construction processing shown in FIG. 15 and is a request made in order to have the calculation node 12 of the migration source recognize the migration source storage device 132 and the migration destination storage device 232. The mount request R4 is constituted from a migration source area R41 and a migration destination area R42. The migration source area R41 stores information for identifying the migration source storage device 132 and the migration destination area R42 stores information for identifying the migration destination storage device 232.

FIG. 22 illustrates a conceptual diagram of the read request R5. The read request R5 is a request issued by the transfer control unit 1223A of the migration source to the I/O node 13 of the migration source during the migration processing shown in FIG. 16 and is a request made in order to acquire transfer target data from the I/O node 13. The read request R5 is constituted from a device ID area R51 and a sector number area R52. The device ID area R51 stores identifiers of the migration source I/O node 13 and the storage device 132. The sector number area R52 stores a sector number where read target (transfer target) data is stored.

FIG. 23 illustrates a conceptual diagram of the write request R6. The write request R6 is a request issued by the transfer control unit 1223A of the migration source to the device virtualization unit 1226 of the migration source during the migration processing shown in FIG. 16 and is a request made in order to copy and transfer the transfer target data from the migration source storage device 132 to the virtual storage device 132V. The write request R6 is constituted from a device ID area R61, a sector number area R62, and a data area R63. The device ID area R61 stores identifiers of the migration destination I/O node 23 and the storage device 23. The sector number area R62 stores sector numbers of the transfer destination. The data area R63 stores transferred data.

Figures 24, 25:
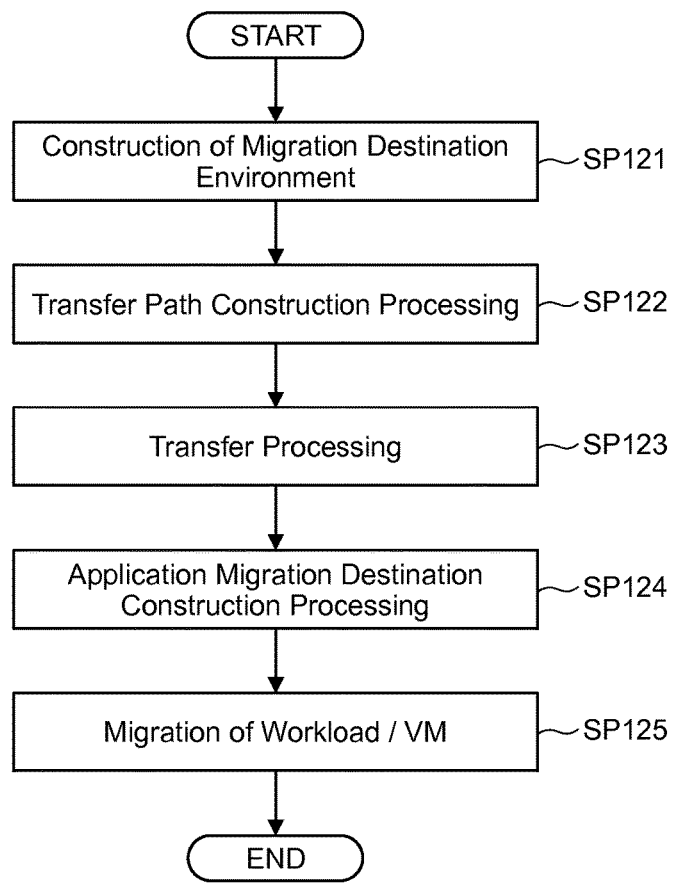
FIG. 24 is a conceptual diagram of a write request.
FIG. 25 is a flowchart illustrating overall migration processing.

FIG. 24 illustrates a conceptual diagram of the write request R7. The write request R7 is a request issued by the device virtualization unit 1226 of the migration source to the data transfer unit 2126 of the migration destination during the migration processing shown in FIG. 16 and is a request made in order to transfer the transfer target data from the migration source to the migration destination. The write request R7 includes a transfer destination address area R71 in addition to the aforementioned write request R6. The transfer destination address area R71 stores an address of the data transfer unit 2126 of the migration destination.

(2-4) Flowcharts

FIG. 25 illustrates a processing sequence for overall migration processing. Firstly, with the migration destination storage system 2, the calculation node 21 in which the data transfer unit 2126 operates executes various settings such as BIOS (Basic Input/Output System) settings, FW (Firm Ware) settings, and registration of the management device 3A; and on the other hand, the I/O node 23 executes various settings such as registration of the calculation node 21, creation of logical volumes, creation of copy pairs, and registration of the management device 3A, thereby constructing a migration destination environment (SP121). Incidentally, this processing is also executed in the first embodiment.

Then, in response to a request from the management device 3A as shown in FIG. 15, each device executes the transfer path construction processing (SP122). Next, in response to a request from the management device 3A as shown in FIG. 16, each device executes the transfer processing (SP123).

Subsequently, with the migration destination storage system 2, OS (Operating System) or VMM (Virtual Machine Monitor) settings and network settings for the calculation node 22, which is the migration destination of the application, are executed (SP124). Then, software such as a workload or VM (Virtual Machine) is migrated from the migration source calculation node 11 to the migration destination calculation node 22 (SP125), and this processing is terminated.

Figure 26:
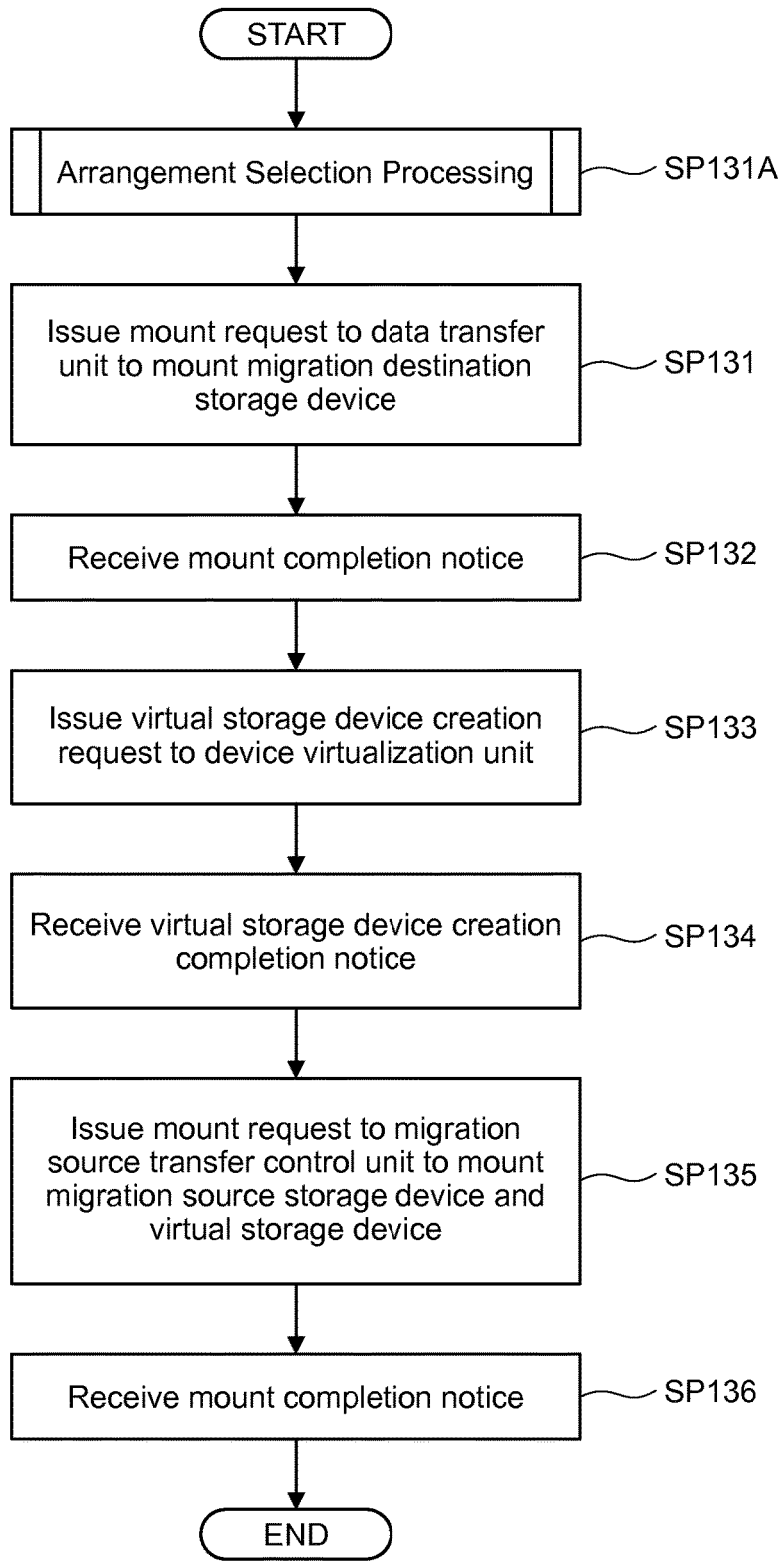
FIG. 26 is a flowchart illustrating migration management processing.

FIG. 26 illustrates a processing sequence for migration management processing executed by the management device 3A during the transfer path construction processing. This migration management processing is executed based on control signals of the transfer management unit 322 and the CPU 31 for the management device 3A as triggered by the acceptance of a transfer path construction command, which is issued from the administrator, by the management device 3A. For the sake of convenience in explanation, the transfer management unit 322 will be described as a processing subject.

Firstly, the transfer management unit 322 executes the arrangement selection processing (FIG. 14) (SP131A) and then issues the mount request R1 to the data transfer unit 2126 of the migration destination to mount the storage device 232 of the migration destination (SP131). After mounting the storage device 232 in response to the mount request R1, the data transfer unit 2126 issues a mount completion notice to the transfer management unit 322.

After receiving the mount completion notice from the data transfer unit 2126 of the migration destination (SP132), the transfer management unit 322 then issues the virtual storage device creation request R2 to the device virtualization unit 1226 of the migration source (SP133).

The device virtualization unit 1226 issues the device information request R3 to the data transfer unit 2126 at the address designated by the virtual storage device creation request R2. The data transfer unit 2126 which has received the device information request R3 acquires various information (such as capacity, sector size, volume ID, activation, stop, and failure information) about the storage device 232 designated by the device information request R3 and issues it as a device information response to the device virtualization unit 1226.

After receiving the device information response from the data transfer unit 2126, the device virtualization unit 1226 refers to the received device information response, further creates an identifier of the calculation node 12, which it operates, and a new storage device IP, which is not redundant within the virtual storage device, adds them as the virtual storage device 132V, which is associated with the storage device 232 of the migration destination, in the storage device correspondence table 1227, and issues a virtual storage device creation completion notice to the transfer management unit 322.

After receiving the virtual storage device creation completion notice from the device virtualization unit 1226 (SP134), the transfer management unit 322 then issues the mount request R4 to the transfer control unit 1223A of the migration source to mount the migration source storage device 132 and the migration destination storage device 232 (SP135). After mounting the migration source storage device 132 and the migration destination storage device 232 designated by the mount request R4, the transfer control unit 1223A issues a mount completion notice to the transfer management unit 322. Then, the transfer management unit 322 receives the mount completion notice from the transfer control unit 1223A (SP136) and terminates this processing.

Incidentally, volumes at the migration source and the migration destination are mounted in the same format as Raw devices or applications by this processing.

Figure 27A:
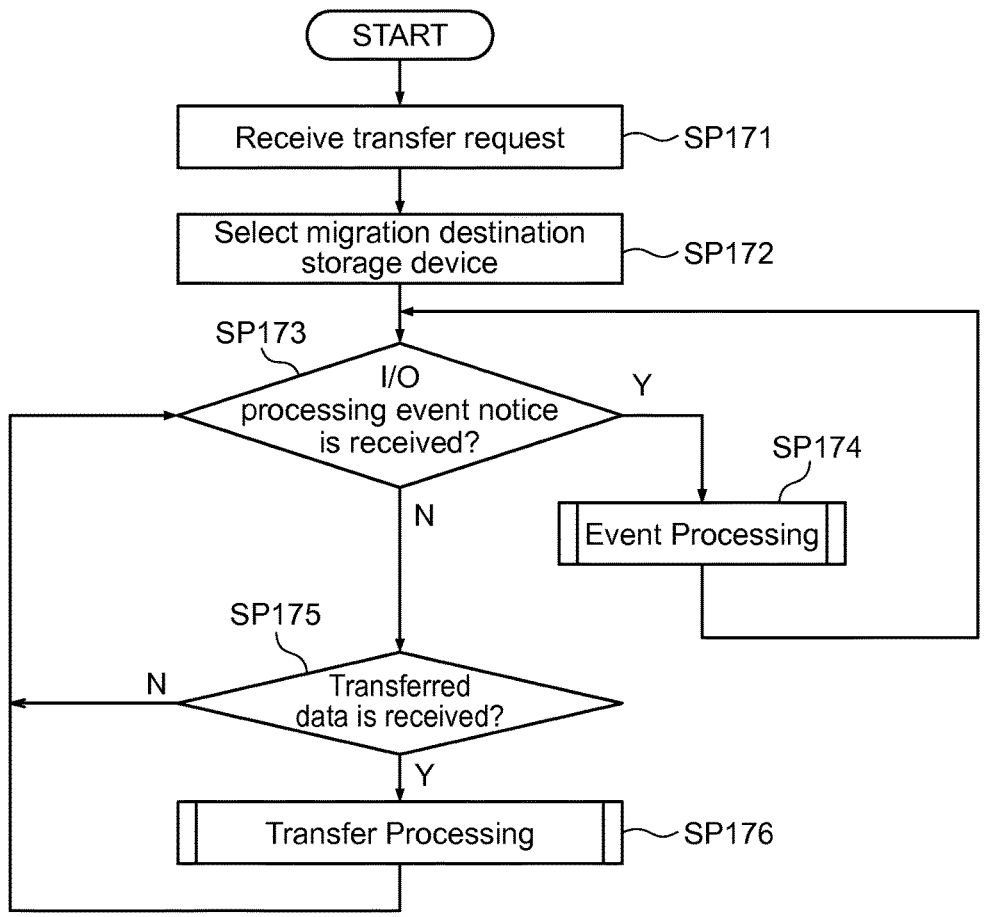
FIG. 27A is a flowchart illustrating event processing and transfer processing at the migration source.

FIG. 27A illustrates a processing sequence for event processing and transfer processing at the migration source. The event processing and the transfer processing are executed based on control signals of the transfer control unit 1223A and the CPU 121 for the migration source as triggered by the receipt of a migration command, which is issued from the management device 3A, by the transfer control unit 1223A of the migration source.

Figure 27B:
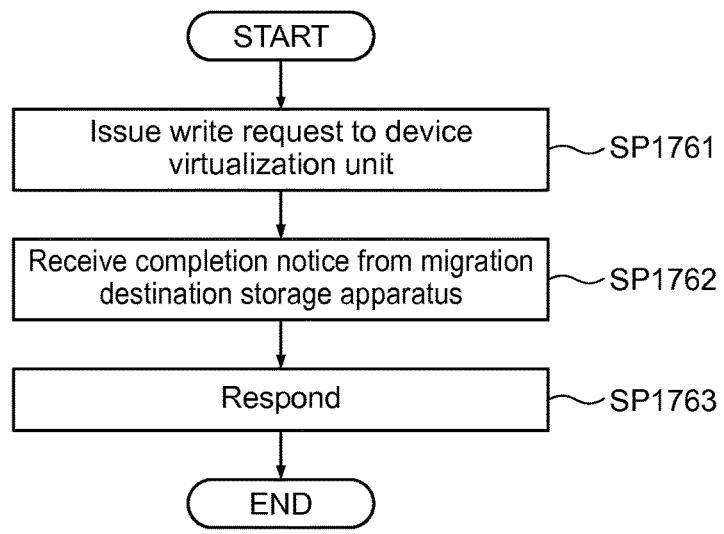
FIG. 27B is a flowchart illustrating transfer processing at the migration source.

Moreover, FIG. 27B illustrates a processing sequence for transfer processing at the transfer control unit 1223A of the migration source. This transfer processing is executed based on control signals of the transfer control unit 1223A and the CPU 121 for the migration source as triggered by the migration of the event processing and the transfer processing in FIG. 27A in step SP176.

The processing in FIG. 27A and FIG. 27B is different from the event processing and the transfer processing (FIG. 12A to FIG. 12C) at the transfer control unit 1223 of the migration source according to the first embodiment because the processing subject is the transfer control unit 1223A, a transfer path is established by selecting the storage device 232 of the migration destination (SP172), and the transfer control unit 1223A issues the write request R6 to the device virtualization unit 1226 (SP1762). Since other processing is the same, an explanation about it has been omitted here.

Figure 28:
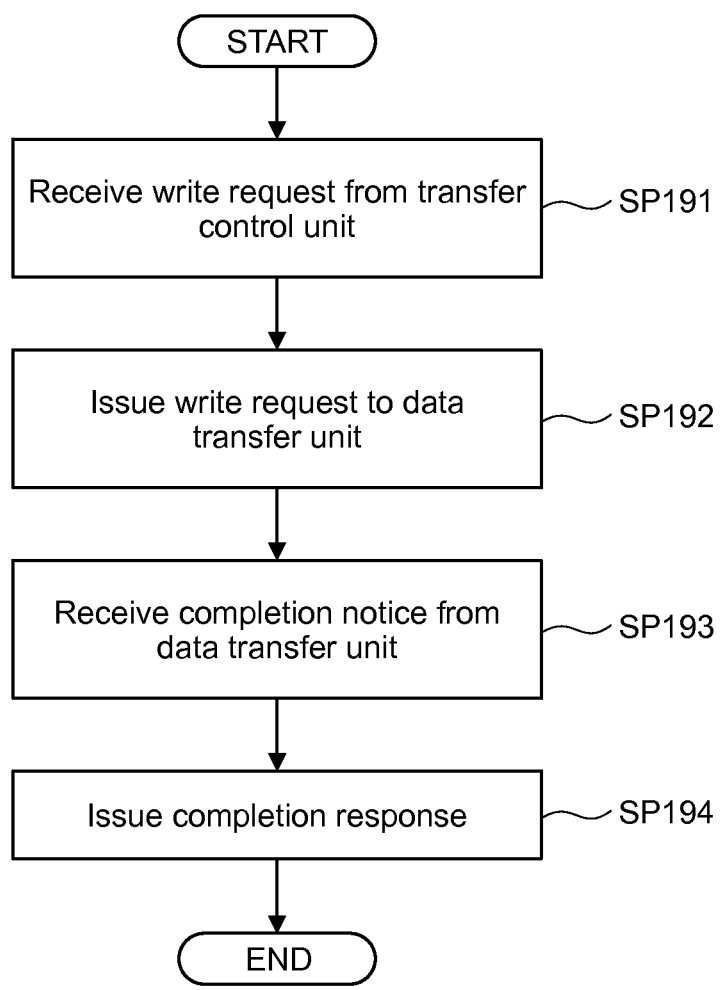
FIG. 28 is a flowchart illustrating transfer processing at the migration source.

FIG. 28 illustrates a processing sequence for transfer processing executed by the device virtualization unit 1226 of the migration source during the transfer processing. This transfer processing is executed based on control signals of the device virtualization unit 1226 and the CPU 121 for the calculation node 12 as triggered by the receipt of a migration command, which is issued from the management device 3A, by the device virtualization unit 1226. For the sake of convenience in explanation, the device virtualization unit 1226 will be described as a processing subject.

Firstly, after receiving the write request R6 from the transfer control unit 1223A (SP191), the device virtualization unit 1226 creates the write request R7 by adding the address of the data transfer unit 2126 of the migration destination to the received write request R6, and issues the write request R7 to the data transfer unit 2126 of the migration destination (SP192).

The data transfer unit 2126 which has received the write request R7 transfers the transfer target data, which is included in the write request R7, to the storage device 232 of the migration destination; and after completing the transfer, the data transfer unit 2126 issues a completion notice to the device virtualization unit 1226.

Then, after receiving the completion notice from the data transfer unit 2126 (SP193), the device virtualization unit 1226 issues a completion response to the transfer control unit 1223A (SP194) and terminates this processing.

Figure 29:
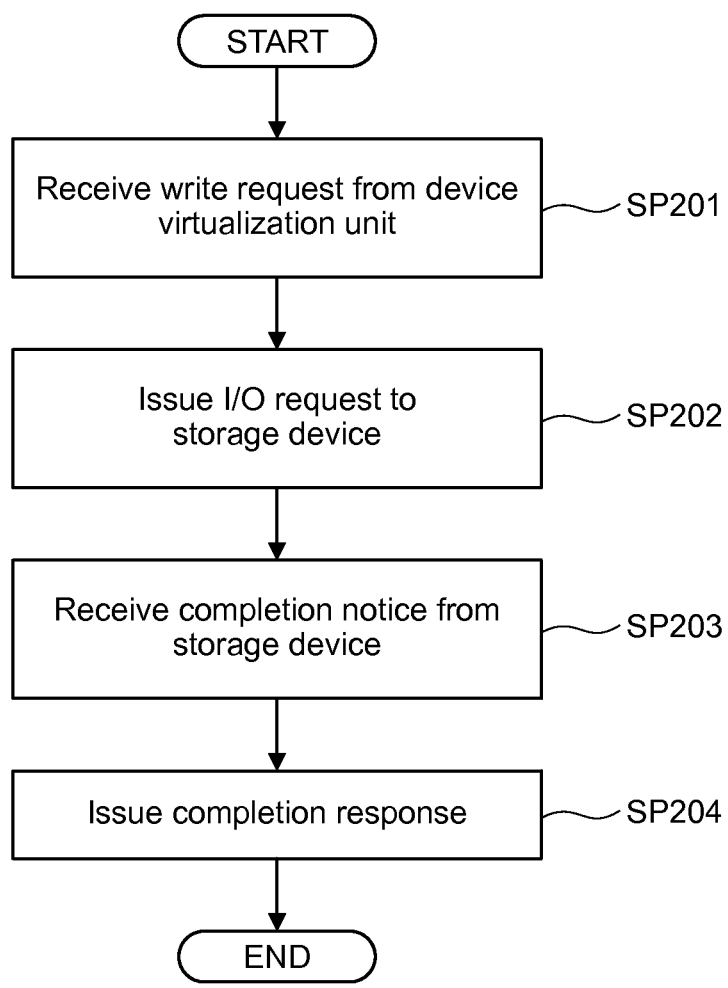
FIG. 29 is a flowchart illustrating transfer processing at the migration destination.

FIG. 29 illustrates a processing sequence for transfer processing executed by the data transfer unit 2126 of the migration destination during the transfer processing. This transfer processing is executed based on control signals of the data transfer unit 2126 and the CPU 211 for the calculation node 21 as triggered by the receipt of a migration command, which is issued from the management device 3A, by the data transfer unit 2126. For the sake of convenience in explanation, the data transfer unit 2126 will be described as a processing subject.

This transfer processing is different from the transfer processing (FIG. 13A to FIG. 13C) at the transfer control unit 2123 of the migration destination according to the first embodiment because the processing subject is the data transfer unit 2126, a transfer path is established by mounting the storage device 232 as the virtual storage device 132V from the device virtualization unit 1226 (SP72), and the data transfer unit 2126 issues the write request R8 to the storage device 232 (SP761). Processing of the write request R8 will be explained below; and since other processing is the same as the first embodiment, an explanation about it has been omitted here.

Firstly, after receiving the migration command from the management device 3A, the data transfer unit 2126 receives the write request R7 from the device virtualization unit 1226 (SP201).

Then, the data transfer unit 2126 creates the write request R8 by deleting the address of the data transfer unit 2126 from the received write request R7, and issues the write request R8 to the storage device 232 of the migration destination (SP202).

The storage device 232 which has received the write request R8 stores the transfer target data, which is included in the data area of the write request R8, in an area designated by the device ID area and the sector number area of the write request R8; and after completing storing it, the storage device 232 issues a completion notice to the data transfer unit 2126.

Then, after receiving the completion notice from the storage device 232 (SP203), the data transfer unit 2126 issues a completion response to the device virtualization unit 1226 (SP204) and terminates this processing.

(2-5) Advantageous Effects of Second Embodiment

The converged system 100A according to this embodiment is configured so that the virtual storage device 132V is placed in the migration source storage system 1A and the transfer target data is transferred via this virtual storage device 132V from the migration source storage device 132 to the migration destination storage device 232. So, the processing of the transfer control unit 1223A can be realized by means of the data copy function between the storage devices directly connected to the calculation node 12. So, it is possible to realize data migration by means of a combination of the copy function of the OS and the higher-level copy function provided by, for example, commercially available backup software. Moreover, the function of the transfer control unit 1223 according to the first embodiment is divided into three functions and the transfer control unit 1223A, the device virtualization unit 1226, and the data transfer unit 2126 are made to take charge of the divided three functions respectively, so that it is possible to distribute the loads.

(3) Third Embodiment

The third embodiment is different from the first embodiment because a calculation node takes charge of the function of an I/O node. Specifically speaking, a configuration where the calculation node and the I/O node are connected on the same network is in a form where a certain node has functions of both the calculation node and the I/O node or the configuration of the calculation node and the I/O node can be dynamically changed. The details of a converged system and a storage system migration method according to this embodiment will be explained below. Incidentally, the same reference numerals are given to the same elements in the

27 third embodiment as those of the first embodiment and an explanation about them has been omitted and different elements will be explained.

(3-1) Overall Configuration

Figure 30:
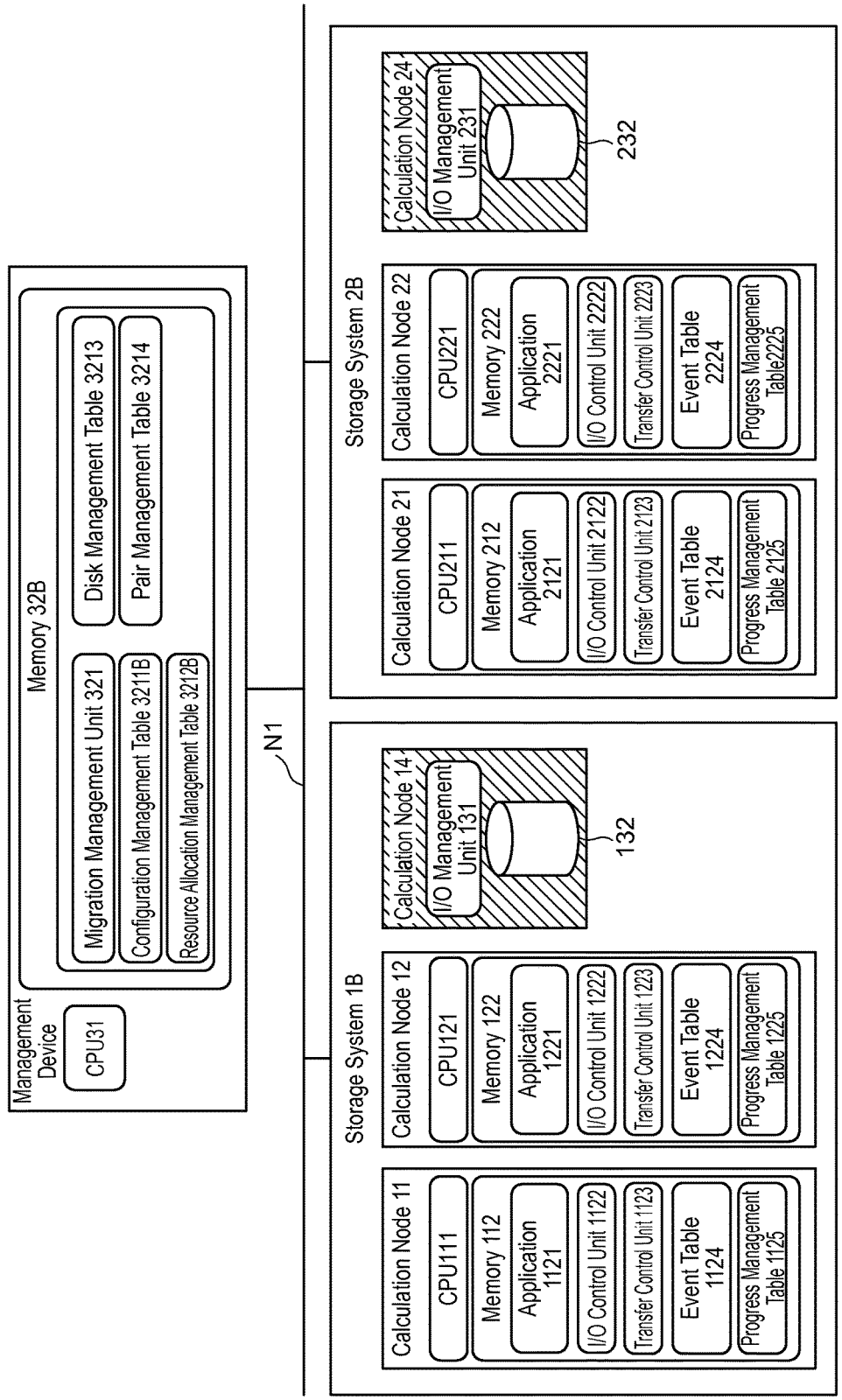
FIG. 30 is an overall configuration diagram of a converged system according to a third embodiment.

FIG. 30 illustrates an overall configuration of a converged system 100B according to the third embodiment. The converged system 100B is composed of storage systems 1B, 2B and a management device 3 and the storage system 1B is composed of calculation nodes 11, 12, and 14. Then, the calculation node 14 is configured by including an I/O management unit 131 and a storage device 132.

Specifically speaking, a calculation node 14 according to this embodiment has the same function as that of the I/O node 13 according to the first embodiment, while it is connected to the calculation nodes 11 and 12 via a communication path N1. Similarly, regarding the storage system 2B, a calculation node 24 has the same function as that of the I/O node 23 according to the first embodiment and is connected to the calculation nodes 21 and 22 via the communication path N1. Other elements are the same as those of the storage system 1 according to the first embodiment.

(3-2) Details of Various Table Structures

Figures 31, 32:
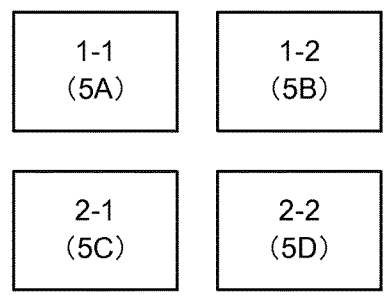
FIG. 31 is a logical configuration diagram of a configuration management table.
FIG. 32 is a conceptual diagram of layout information.

FIG. 31 illustrates a conceptual diagram of a configuration management table 3211B. The configuration management table 3211B stores hardware specification information and layout information about calculation nodes. The configuration management table 3211B is a table created by the management device 3B by periodically collecting configuration information about the calculation nodes of each of the storage systems 1B and 2B and is used to decide a calculation node as an offload location when offloading the transfer processing.

Specifically speaking, the configuration management table 3211B is different from the configuration management table 3211 according to the first embodiment because it includes a layout column 32117. This layout column 32117 stores predetermined physical mount position information (layout information) about each calculation node.

FIG. 32 illustrates a conceptual diagram of the layout information. This layout information is information for identifying a mount position of each calculation node in one storage system chassis when the calculation nodes are placed in two vertical and two horizontal rows respectively. Specifically speaking, the layout information is composed of a combination of numerical values indicating the vertical direction and the horizontal direction.

Figures 33, 34:
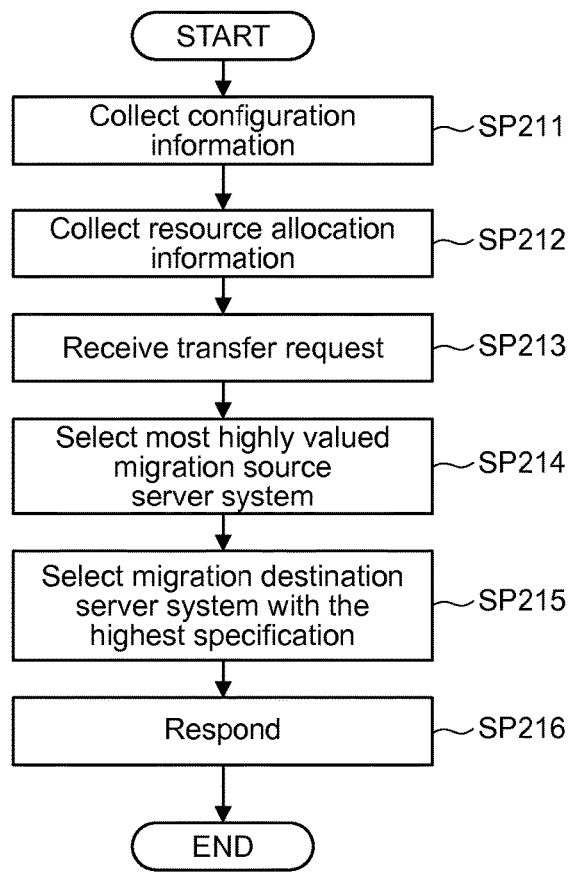
FIG. 33 is a logical configuration diagram of a resource allocation management table.
FIG. 34 is a flowchart illustrating arrangement selection processing according to the third embodiment.

Accordingly, FIG. 33 and FIG. 34 show that, for example, a calculation node whose identifier is "Node 5A" is mounted at a physical position indicated by layout information "1-1."

FIG. 33 illustrates a conceptual diagram of a resource allocation management table 3212B. The resource allocation management table 3212B stores information about an amount of resources allocated to calculation nodes and I/O nodes. The resource allocation management table 3212 is a table created by the management device 3 by periodically collecting configuration information about calculation nodes of each of the storage systems 1 and 2 and is used to decide a calculation node as an offload location when offloading the transfer processing.

Specifically speaking, the resource allocation management table 3212B is different from the resource allocation management table 3212 (FIG. 4) according to the first embodiment because it includes a role column 3212B2. This role column 3212B2 stores information indicating whether the relevant calculation node is constructed as a calculation node or as an I/O node.

(3-3) Flowcharts

FIG. 34 illustrates a processing sequence for arrangement selection processing according to the third embodiment. This arrangement selection processing is executed based on control signals of the migration management unit 321 and the CPU 31 for the management device 3B periodically or as triggered by the receipt of a migration command, which is issued from the administrator, by the management device 3B. For the sake of convenience in explanation, the migration management unit 321 will be described as a processing subject.

Firstly, the migration management unit 321 periodically collects configuration information from a plurality of calculation nodes included in the storage systems 1B and 2B (SP211). Moreover, the migration management unit 321 periodically collects resource allocation information (SP212). Incidentally, the migration management unit 321 stores and manages the then collected configuration information and resource allocation information in the configuration management table 3211B in FIG. 31 and the resource allocation management table 3212B in FIG. 33.

Then, after receiving a migration command from the administrator via a user interface of the management device 3B or a migration command which is periodically issued (SP213), the migration management unit 321 refers to the configuration management table 3211B and the resource allocation management table 3212B, calculates an unused resource amount, and selects the calculation node 12, which is decided based on an evaluation index calculated from the calculated unused resource amount and the distance from the I/O node, as a calculation node which is an offload location for the transfer processing (SP214).

When calculating the evaluation index, the migration management unit 321 defines, for example, the unused resource amount as a value obtained by adding a sum of a clock frequency of an unused CPU in the calculation node 11×the number of cores, to a sum of the number of unused network I/Fs×bandwidth and defines the evaluation index as a value obtained by subtracting the distance between the calculation node 11 and the calculation node 14 from the unused resource amount.

The distance between the calculation node 11 and the calculation node 14 is calculated as follows, for example. Incidentally, it is assumed that the layout information about the calculation node 11 is "1-1" and the layout information about the calculation node 14 is "1-2." The lengthwise difference is "1" by subtracting "1" indicative of the lengthwise position of the calculation node 11 from "2" indicative of the lengthwise position of the calculation node 14. On the other hand, the lateral difference is "0" by subtracting "1" indicative of the lateral position "1" of the calculation node 11 from "1" indicative of the lateral position of the calculation node 14. Then, "1" which is a value obtained by adding the lengthwise difference "1" to the lateral difference "0" is calculated as the difference between the calculation node 11 and the calculation node 14.

Then, the migration management unit 321 selects the most highly valued calculation node as the calculation node which is the offload location. Incidentally, the evaluation of the unused resource amount is not limited to this example and the unused resource amount may be evaluated based on load information in consideration of an actually used amount.

Next, the migration management unit 321 refers to the configuration management table 3211B and selects the calculation node 21 with the highest hardware specification as a migration destination calculation node (SP215), responds to the migration command by, for example, displaying the result on a display screen of the management device 3 (SP216), and terminates this processing.

(3-4) Advantageous Effects of Third Embodiment

The storage system 1B according to this embodiment described above is designed to select the calculation node 12 with the shortest physical distance from the calculation node 14, which stores the transfer target data, when selecting the calculation node to offload the transfer processing. So, it is possible to prevent the delay of the transfer processing more reliably.

(4) Other Embodiments

The storage system 1 according to this embodiment is configured by including the calculation nodes 11 and 12; however, the present invention is not limited to this example, and the storage system 1 may include a plurality of calculation nodes. The same applies to the storage system 2. In this case, data can be transferred via a transfer path for transferring data at faster speeds by broadening options for the calculation node to offload the transfer processing and options for the migration destination calculation node.

Furthermore, the storage system 1B according to the third embodiment is configured so that one I/O node, that is, the calculation node 14 is included; however, the configuration of the storage system 1B is not limited to this example and may be configured by including a plurality of I/O nodes. The same applies to the storage system 2. In this case, calculation nodes with the same transfer path may be used or a different transfer path may be selected for each volume.

REFERENCE SIGNS LIST 1 storage system
2 storage system
3 management device
1122 I/O control unit
1223, 2123, 1223A transfer control units
1225 device virtualization unit
2126 data transfer unit
321 migration management unit
322 transfer management unit

The invention claimed is:

1. A converged system comprising a migration source storage system, a migration destination storage system, and a management device for centrally managing the migration source storage system and the migration destination storage system, all of which are connected so that they can communicate with each other,
   wherein the migration source storage system is composed of a first calculation node, a second calculation node, and a first I/O node and an application which issues an I/O request operates in the first calculation node, and the migration source storage system includes:
   a migration source I/O processing unit for executing I/O processing in response to the I/O request from the application and issuing an I/O processing event notice indicating an execution result of the I/O processing; and
   a migration source transfer processing unit for transferring data, which is stored in the first I/O node, to the migration destination storage system and judging, upon receipt of the I/O processing event notice and based on the I/O processing event notice, whether or not data which should be re-transferred exists in the data stored in the first I/O node, and executing processing for transferring the data, which should be re-transferred, to the migration destination storage system;
   wherein the migration destination storage system is composed of a third calculation node, a fourth calculation node, and a second I/O node,
   and includes:
   a migration destination I/O processing unit for executing I/O processing in response to an I/O request from the migrated application after the application is migrated, while issuing the I/O processing event notice; and
   a migration destination transfer processing unit for storing the data, which is transferred from the migration source transfer processing unit, in the second I/O node, and determining, upon receipt of the I/O processing event notice, whether or not there is data which should be re-transferred exists among the data stored in the second I/O node based on the I/O processing event notice, receiving the data, which should be re-transferred, from the migration source transfer processing unit, and storing the data in the second I/O node;
   wherein the management device includes a migration management unit for issuing a migration command, which includes information for designating an operation location for each of the migration source I/O processing unit, the migration source transfer processing unit, and the migration destination transfer processing unit, to the first calculation node, the second calculation node, the third calculation node, the fourth calculation node, the first I/O node, and the second I/O node; and
   wherein the migration management unit have information included in the migration command, the information:
   designates the first calculation node, on which the application is running, as an operation location for the migration source I/O processing unit;
   designates the second calculation node, which is different from the operation location for the migration source I/O processing unit, as an operation location for the migration source transfer processing unit;
   designates either calculation node of the third node or fourth calculation node as a migration destination calculation node of the application and an operation location for the migration destination I/O processing unit; and
   designates either calculation node of the third or fourth calculation node, which is different from the operation location for the migration destination I/O processing unit, as an operation location for the migration destination transfer processing unit.

2. The converged system according to claim 1, wherein the migration source storage system is composed of a plurality of calculation nodes, including the first and second calculation nodes, and a plurality of I/O nodes including the first I/O node; and
   wherein the management device acquires and manages configuration information about the plurality of calculation nodes and I/O nodes, calculates an unused resource amount based on the managed configuration information, selects a calculation node or I/O node whose calculated unused resource amount is the largest, selects the selected calculation node or I/O node as the operation location for the migration source transfer processing unit, and issues the migration command to the selected calculation node or I/O node.

3. The converged system according to claim 1, wherein the management device issues the migration command when receiving any of the following commands: in a case where it receives a replacement execution command to replace the migration source storage system based on its life; a case where it receives a load leveling execution command to level loads on the migration source storage system and the migration destination storage system as targets; or a case where it receives a power saving execution command to save electricity by executing processing for the migration source storage system only on the migration destination storage system one-sidedly.

4. The converged system according to claim 1, wherein when a progress rate of transfer processing by the migration source transfer processing unit exceeds a predetermined threshold value, the management device issues an application migration command.

5. The converged system according to claim 1, wherein the second calculation node includes:
   a transfer control unit for acquiring transfer target data from the first I/O node; and
   a device virtualization unit for creating a virtual storage device associated with a storage device included in the second I/O node;
   wherein the third calculation node includes a data transfer unit for transferring the transfer target data to the storage device;
   wherein the second calculation node transfers the data, which has been acquired by the transfer control unit from the first I/O node, to the virtual storage device and transfers the data, which has been transferred by the device virtualization unit to the virtual storage device, to the data transfer unit; and
   wherein the third calculation node transfers the data, which has been transferred by the data transfer unit from the device virtualization unit, to the storage device.

6. The converged system according to claim 1, wherein the migration source storage system is composed of a plurality of calculation nodes including the first and second calculation nodes; and
   wherein the management device acquires and manages configuration information about the plurality of calculation nodes, calculates an unused resource amount based on the managed configuration information, selects a calculation node, whose value obtained by subtracting a physical distance from the first I/O node from the calculated unused resource amount is the largest, as the second calculation node, and issues a migration command to the selected second calculation node.

7. A storage system migration method for a converged system including a migration source storage system, a migration destination storage system, and a management device for centrally managing the migration source storage system and the migration destination storage system, all of which are connected so that they can communicate with each other,
   wherein the migration source storage system is composed of a first calculation node, a second calculation node, and a first I/O node and an application which issues an I/O request operates in the first calculation node, and
   wherein the migration destination storage system is composed of a third calculation node, a fourth calculation node, and a second I/O node,
   the storage system migration method comprising:
   a first step executed by a migration source I/O processing unit executing I/O processing in response to the I/O request from the application and issuing an I/O processing event notice indicating an execution result of the I/O processing;
   a second step executed by a migration source transfer processing unit transferring data, which is stored in the first I/O node, to the migration destination storage system and judging, upon receipt of the I/O processing event notice and based on the I/O processing event notice, whether or not data which should be re-transferred exists in the data stored in the first I/O node, and executing processing for transferring the data, which should be re-transferred, to the migration destination storage system;
   a third step executed by a migration destination I/O processing unit executing I/O processing in response to an I/O request from the migrated application after the application is migrated, while issuing the I/O processing event notice;
   a fourth step executed by a migration destination transfer processing unit storing the data, which is transferred from the migration source transfer processing unit, in the second I/O node, and determining, upon receipt of the I/O processing event notice, whether or not data which should be re-transferred exists in the data stored in the second I/O node and based on the I/O processing event notice, receiving the data, which should be re-transferred, from the migration source transfer processing unit, and storing the data in the second I/O node; and
   a fifth step executed by the management device issuing a migration command, which includes information for designating an operation location for each of the migration source I/O processing unit, the migration source transfer processing unit, and the migration destination transfer processing unit, to the first calculation node, the second calculation node, the third calculation node, the fourth calculation node, the first I/O node, and the second I/O node; and
   wherein in the fifth step, the management device have information included in the migration command, the information:
   designates the first calculation node, in which the application operates, as an operation location for the migration source I/O processing unit;
   designates the second calculation node, which is different from the operation location for the migration source I/O processing unit, as an operation location for the migration source transfer processing unit;
   designates either the third calculation node or the fourth calculation node as a migration destination calculation node of the application and an operation location for the migration destination I/O processing unit; and
   designates either the third calculation node or the fourth calculation node, which is different from the operation location for the migration destination I/O processing unit, as an operation location for the migration destination transfer processing unit.

8. The storage system migration method according to claim 7, wherein the migration source storage system is composed of a plurality of calculation nodes, including the first and second calculation nodes, and a plurality of I/O nodes including the first I/O node; and wherein in the fifth step, the management device acquires and manages configuration information about the plurality of calculation nodes and I/O nodes, calculates an unused resource amount based on the managed configuration information, selects a calculation node or I/O node whose calculated unused resource amount is the largest, selects the selected calculation node or I/O node as the operation location for the migration source transfer processing unit, and issues the migration command to the selected calculation node or I/O node.

9. The storage system migration method according to claim 7, wherein in the fifth step, the management device issues the migration command when receiving any of the following commands: in a case where it receives a replacement execution command to replace the migration source storage system based on its life; a case where it receives a load leveling execution command to level loads on the migration source storage system and the migration destination storage system as targets; or a case where it receives a power saving execution command to save electricity by executing processing for the migration source storage system only on the migration destination storage system one-sidedly.

10. The storage system migration method according to claim 7, wherein when a progress rate of transfer processing by the migration source transfer processing unit exceeds a predetermined threshold value in the fifth step, the management device issues an application migration command.

11. The storage system migration method according to claim 7, wherein the second calculation node includes:

a transfer control unit for acquiring transfer target data from the first I/O node; and a device virtualization unit for creating a virtual storage device associated with a storage device included in the second I/O node;

wherein the third calculation node includes a data transfer unit for transferring the transfer target data to the storage device;

wherein in the second step, the second calculation node transfers the data, which has been acquired by the transfer control unit from the first I/O node, to the virtual storage device and transfers the data, which has been transferred by the device virtualization unit to the virtual storage device, to the data transfer unit; and wherein in the fourth step, the third calculation node transfers the data, which has been transferred by the data transfer unit from the device virtualization unit, to the storage device.

12. The storage system migration method according to claim 7, wherein the migration source storage system is composed of a plurality of calculation nodes including the first and second calculation nodes; and wherein in the fifth step, the management device acquires and manages configuration information about the plurality of calculation nodes, calculates an unused resource amount based on the managed configuration information, selects a calculation node, whose value obtained by subtracting a physical distance from the first I/O node from the calculated unused resource amount is the largest, as the second calculation node, and issues a migration command to the selected second calculation node.

* * * * *